(12) United States Patent
Davis et al.

(10) Patent No.: US 6,513,714 B1
(45) Date of Patent: Feb. 4, 2003

(54) CHARACTER RECONSTRUCTION AND ELEMENT LEVEL PROCESSING IN BAR CODE SCANNING SYSTEM

(75) Inventors: Glen W. Davis, Junction City, OR (US); Jonathan R. Brandt, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/394,986

(22) Filed: Sep. 13, 1999

Related U.S. Application Data

(60) Provisional application No. 60/100,288, filed on Sep. 14, 1998.

(51) Int. Cl.$^7$ ................................................. G06K 7/10
(52) U.S. Cl. ............................... 235/462.16; 235/462.01
(58) Field of Search ........................ 235/462.01–462.49

(56) References Cited

U.S. PATENT DOCUMENTS

| | | | | |
|---|---|---|---|---|
| 4,012,716 A | * | 3/1977 | Herrin ..................... | 235/462.19 |
| 4,289,957 A | | 9/1981 | Neyroud et al. ............. | 235/462 |
| 4,308,455 A | | 12/1981 | Bullis et al. ................ | 235/463 |
| 4,409,469 A | | 10/1983 | Yasuda et al. ............... | 235/463 |
| 4,421,978 A | | 12/1983 | Laurer et al. .......... | 235/462.07 |
| 4,488,678 A | | 12/1984 | Hara et al. .................. | 235/463 |
| 4,608,489 A | | 8/1986 | Ramsey et al. .............. | 235/462 |
| 4,717,818 A | | 1/1988 | Broockman et al. ........ | 235/462 |
| 4,861,972 A | | 8/1989 | Elliott et al. ................ | 235/462 |
| 4,866,257 A | | 9/1989 | Elliott et al. ................ | 235/436 |
| 4,963,719 A | | 10/1990 | Brooks et al. .............. | 235/462 |
| 4,973,829 A | | 11/1990 | Ishida et al. ................ | 235/462 |
| 4,992,650 A | | 2/1991 | Somerville .................. | 235/462 |
| 5,028,772 A | | 7/1991 | Lapinski et al. ............. | 235/467 |
| 5,045,677 A | | 9/1991 | Okamura .................... | 235/462 |
| 5,124,538 A | | 6/1992 | Lapinski et al. ............. | 235/467 |
| 5,144,118 A | | 9/1992 | Actis et al. .................. | 235/462 |
| 5,184,005 A | * | 2/1993 | Ukai et al. ............. | 235/462.16 |

(List continued on next page.)

FOREIGN PATENT DOCUMENTS

| | | | |
|---|---|---|---|
| EP | 0431264 | 6/1991 | |
| EP | 0436072 | 7/1991 | |
| EP | 0 745 951 A2 | 12/1996 | |
| JP | 06195497 | 7/1994 | |
| JP | 06325195 | 11/1994 | .......... G06K/7/015 |
| JP | 407200719 A | 8/1995 | ............ G06K/7/00 |

OTHER PUBLICATIONS

Jonathan R. Brandt; Glen W. Davis and Charles F. Atwater, "Correlation and Stitching Techniques in a Bar Code Scanning System," US application 09/394,340 filed Sep. 13, 1999. (Status: allowed).

Jonathan R. Brandt and Glen W. Davis, "Symbology Determination To Aid Decoding In a Bar Code Scanning System," US application 09/395,023 filed Sep. 13, 1999. (Status: pending).

Glen W. Davis and Jonathan R. Brandt, "Decoding System and Methods in a Bar Code Scanning System," US application 09/395,093 filed Sep. 13, 1999. (Status: pending).

Glen W. Davis and Jonathan R. Brandt, "Compensation For Scan Line Variation In a Bar Code Scanner System," US application 09/394,339 filed Sep. 13, 1999. (Status: allowed).

*Primary Examiner*—Michael G. Lee
*Assistant Examiner*—Jamara A. Franklin
(74) *Attorney, Agent, or Firm*—Stoel Rives LLP

(57) ABSTRACT

In a bar code scanning system, character reconstruction and element level processing techniques enable label information to be recreated from defective or corrupted information that would otherwise be undecodable by standard decoding algorithms. Reconstruction methods allow for undecodable characters or elements to be reconstructed from partial information based upon known or expected structural characteristics for the particular label symbologies being decoded. Element edge histograms, edge strength indicators and quality measures are used to enhance label readability and bar code scanner decoding capabilities.

31 Claims, 13 Drawing Sheets

U.S. PATENT DOCUMENTS

| | | | | |
|---|---|---|---|---|
| 5,194,722 A | | 3/1993 | Mergenthaler et al. | 235/463 |
| 5,241,164 A | | 8/1993 | Pavlidis et al. | 235/462 |
| 5,270,525 A | | 12/1993 | Ukai et al. | 235/472 |
| 5,276,316 A | | 1/1994 | Blanford | 235/462 |
| 5,278,398 A | | 1/1994 | Pavlidis et al. | 235/462 |
| 5,311,001 A | | 5/1994 | Joseph et al. | 235/462 |
| 5,329,104 A | | 7/1994 | Ouchi et al. | 235/462 |
| 5,334,825 A | | 8/1994 | Maddox | 235/437 |
| 5,352,878 A | | 10/1994 | Smith et al. | 235/462 |
| 5,396,059 A | | 3/1995 | Yeates | 250/214 |
| 5,412,196 A | | 5/1995 | Surka | 235/462 |
| 5,444,231 A | | 8/1995 | Shellhammer et al. | 235/462 |
| 5,457,308 A | * | 10/1995 | Spitz et al. | 235/462 |
| 5,481,098 A | | 1/1996 | Davis et al. | 235/462.07 |
| 5,493,108 A | | 2/1996 | Cherry et al. | 235/454 |
| 5,514,858 A | * | 5/1996 | Ackley | 235/462.16 |
| 5,550,365 A | * | 8/1996 | Klancnik et al. | 235/462 |
| 5,637,853 A | * | 6/1997 | Joseph | 235/462 |
| 5,686,716 A | | 11/1997 | La | 235/462 |
| 5,729,001 A | | 3/1998 | Spitz | 235/462.01 |
| 5,739,518 A | | 4/1998 | Wang | 236/454 |
| 5,767,497 A | | 6/1998 | Lei | 235/462 |
| 5,767,498 A | * | 6/1998 | Heske, III et al | 235/463 |
| 5,798,510 A | | 8/1998 | Watanabe et al. | 235/462 |
| 5,821,520 A | | 10/1998 | Mulla et al. | 235/462.27 |
| 5,825,006 A | | 10/1998 | Longacre, Jr. et al. | 235/462 |
| 5,837,983 A | | 11/1998 | Actis et al. | 235/437 |
| 5,914,476 A | | 6/1999 | Gerst, III et al. | 235/462.07 |
| 5,917,172 A | | 6/1999 | Watanabe et al. | 235/462.12 |
| 5,929,420 A | | 7/1999 | Cai | 235/462.07 |
| 5,936,224 A | | 8/1999 | Shimizu et al. | 235/462.1 |
| 5,942,740 A | | 8/1999 | Watanabe et al. | 235/462.02 |
| 5,969,326 A | | 10/1999 | Ogami | 235/462.27 |
| 6,039,253 A | | 3/2000 | Reichenbach et al. | 235/462.01 |
| 6,073,847 A | | 6/2000 | Reichnenbach et al. | 235/462.12 |
| 6,095,419 A | | 8/2000 | Watanabe et al. | 235/462.02 |
| 6,095,420 A | * | 8/2000 | Kawai et al. | 235/462.16 |
| 6,095,422 A | | 8/2000 | Ogami | 236/462.27 |
| 6,119,941 A | | 9/2000 | Katsandres et al. | 235/462.07 |
| 6,145,745 A | | 11/2000 | Hauser et al. | 235/462.07 |
| 6,164,540 A | | 12/2000 | Bridglall et al. | 235/462.01 |

* cited by examiner

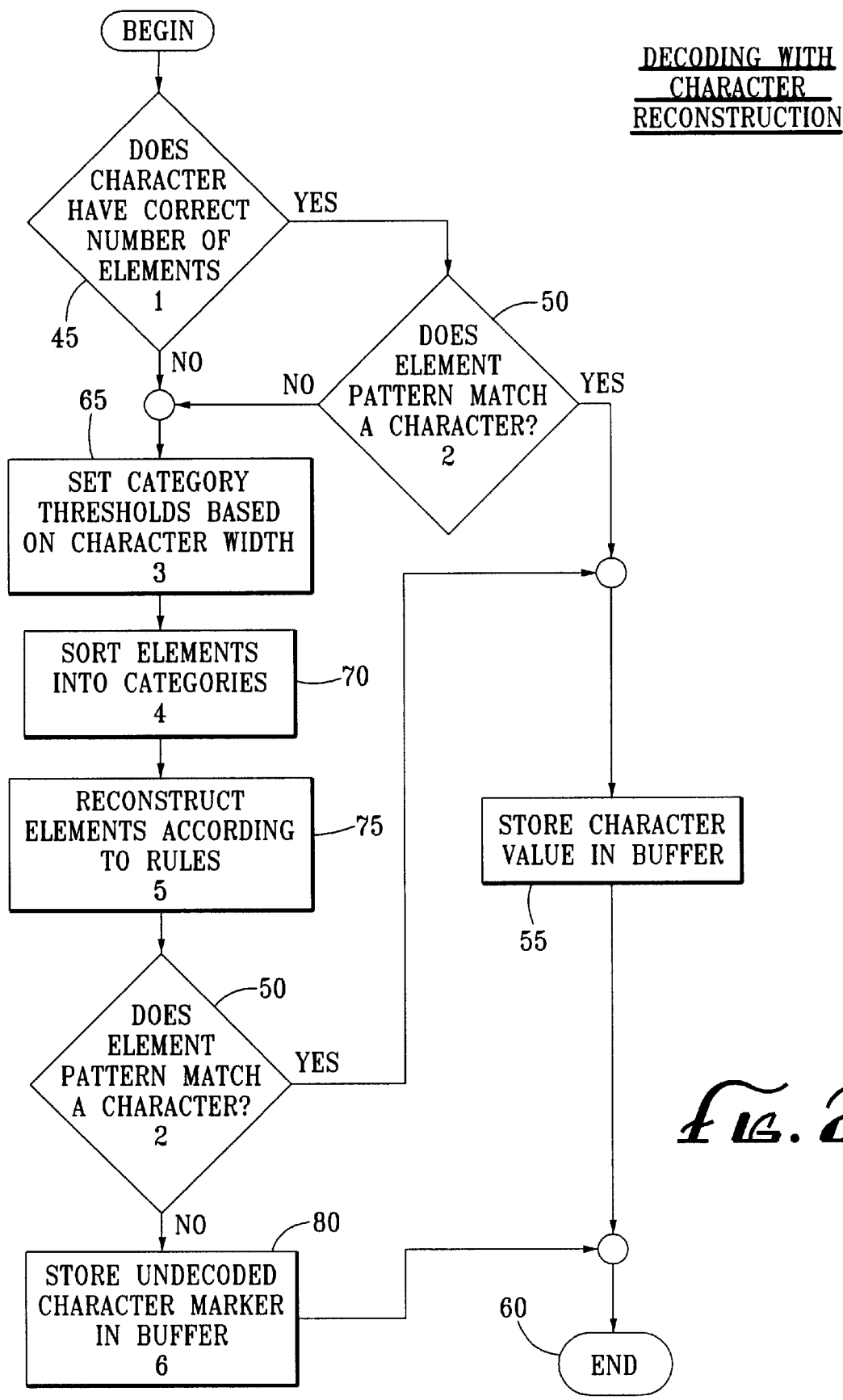
FIG. 2 — DECODING WITH CHARACTER RECONSTRUCTION

LOW DENSITY THERMAL PRINTING WITH GAPS AND VOIDS

CHARACTER RECONSTRUCTION AND ELEMENT LEVEL PROCESSING IN BAR CODE SCANNING SYSTEM

RELATED APPLICATION

This application claims the benefit of U.S. Provisional Application No. 60/100,288, filed Sep. 14, 1998.

COPYRIGHT NOTICE/AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING APPENDIX

This application includes a computer program listing appendix on a single compact disc, the contents of which are herein incorporated by reference. The compact disc contains a single 318KB file entitled 09-394986, created on Nov. 9, 2001.

FIELD OF THE INVENTION

The field of the present invention relates to data reading devices and, in particular, to optical code scanners or other label scanning and decoding systems of the type that are designed to read labels having information which may be presented in any one of a number of different codes commonly in use. More particularly, it relates to a system and methodologies for reconstructing complete bar code label information from partial scan information obtained under of variety of non-ideal situations.

BACKGROUND OF THE INVENTION

Existing labels encode information in a variety of formats and are commonly employed in applications such as inventory control systems and, most familiarly, affixed to consumer goods for retail store check-out, among others. Typically, the information encoded on each label uniquely identifies the product or product line. Such information, once decoded, can be used to identify other information, e.g., price, associated with the labeled object.

Optical scanning systems use various apparatus and methods for the purpose of reading such labels, identifying the particular label format, and decoding the information stored in the label. In the case of bar code scanners, for example, a typical system has one or more light sources, such as a laser or laser diode, which are used to scan the label. Traditional labels are ordinarily composed of a series of parallel dark and light areas, e.g., bars and spaces. A collection subsystem detects at least a portion of the light reflected from the label, distinguishes between dark and light areas, and converts the optical information into an electrical signal that can be recognized by a computer or other electronic system.

Labels, e.g., bar codes or other such symbols, commonly include characters (which can, e.g., be alphanumeric) defined by a number of elements, e.g., bars and spaces. For any given symbology, individual characters within a label are comprised of a given number of elements, and the width of each of these elements is expected to be within a known range, thus allowing the character to be reliably decoded.

Exemplary of this is the Universal Product Code (UPC) label in which each character is made up of two bars and two interleaved spaces. The width of each character is measured in units called "modules" with each character being seven modules in width. The width of any particular bar or space within the character representation is between one and four modules. The character value depends on the relative width in modules of the two bars and two spaces it comprises. For example, indicating bars with a 1 and spaces with a 0, a sequence of 111 would represent a bar that is three modules in width.

If either of the above characteristics is violated (i.e., number of elements per character and/or width of elements in known range), typically the character in question will be considered to be undecodable and the entire scan of data will be discarded. Factors that could cause this are: if an individual element has been split into multiple pieces; multiple elements have been merged into a single piece; or, if the width of an element has been distorted beyond specified boundaries. In any of these instances, some existing systems may require a new scan—discarding the entire scan as unusable—even though only one character may be affected by the degradation.

Some codes make use of parity formats to form alternative representations for the digits 0 through 9. These alternate formats may be utilized in different locations on a label thus providing means for verifying accuracy of data. For example, UPC labels, with the exception of UPC-E labels, are comprised of right and left segment halves. Characters in the left segment are of odd parity and, when scanned from left to right, all begin with spaces. Characters in the right segment are of even parity and, when scanned from left to right, all begin with bars. Thus, the character value 5 may be represented as 0110001 using odd parity or 1001110 using even parity. Likewise, the character 3 may be represented as 0111101 using odd parity or 1000010 using even parity.

Additionally, many labels utilize feature characters, such as center or guard characters, as delimiters or to separate segments of the label. Most UPC labels, as noted above, have left and right segment halves. These segment halves are separated by a center band character that typically comprises two single module bars and three interleaved single module spaces. The beginning and end of the label are delimited by a pair of guard characters, each of which typically comprises two single module bars and one interleaved, single module space. The bar/space representations of these feature characters are unique from that of data characters to enhance detection and decoding capability. Furthermore, an unprinted margin area or white space is typically located outwardly of the two guard characters.

In addition to the UPC formats, a variety of other label formats exist which vary, among other ways, in structure, content, parity requirements, and type of feature characters. Code 39 and Code 128, for example, are both non-segmented label formats, i.e., they have no center feature characters separating two or more segments of bars. Other label encoding schemes have been developed which have differing pattern structures for the dark and light areas. Exemplary of these latter code types are the stacked bar code formats referred to as Code 49 and PDF 417.

As a practical matter, recovering information from optical code labels poses many difficulties that must be overcome by a scanning system. For example, in order to read a label completely, i.e., from left guard character or margin to right guard character or margin, in a single optical pass, the label must be properly oriented with respect to the scanning beam.

Failure to read in a single pass, e.g., when a label is mis-framed or read diagonally across a top or bottom border, results in the reading of incomplete or degraded character data and yields partial scans of the label which must be assembled properly in order to formulate valid label information, otherwise the object must be re-positioned and re-scanned until a successful read is obtained. In such cases, data on either end of an input string may be inaccurately read, yet may appear to be an otherwise structurally valid character.

Even where a single optical pass does traverse the entire label from left to right, problems in decoding the label may occur, for example, when the label is folded, split, torn or similarly damaged, thus making it difficult to recover label information. Likewise, differences in package configurations, label sizes and locations, and scanner positions, among other factors, serve to exacerbate these problems. As a result, partially read labels are both more likely to occur and more difficult to decipher. In many applications, such as store check-out stands, this translates to a need for high operator concentration and dexterity yet results in non-optimum speed or efficiency, since the operator must take care to ensure that the object to be scanned is properly positioned (or must reposition and rescan repeatedly for a valid reading). As well, the multitude of optical code formats currently in use may require differing methodologies to be used in order to realize ideal (i.e., optimum speed and efficiency) decoding. In settings where multiple formats may be encountered by the same operator, additional effort and skill may be required to ensure that the system is set for the ideal decoding methodology to be utilized for a particular symbology.

Certain methods of assembling or concatenating data read on partial scans have been proposed to address these difficulties. However, existing methods are inherently limited in their ability to detect and correct for inaccurate and, particularly, missing data reads within partial scans. As well, to the extent that some existing systems have devised more aggressive methods of decoding poor quality or damaged labels, such methods are typically employed at the expense of speed and efficiency in processing good quality, clean labels.

SUMMARY OF THE INVENTION

To address the above and many other problems that may be encountered in order to accurately decode a bar code label, the present system provides for a variety of complementary reconstruction methodologies that may be selectively and systematically employed. Aside from known standard decoding algorithms which provide for direct decoding of clean label information obtained from a single scan, the system and method of the preferred embodiment further provides for implementation of known stitching techniques to combine multiple partial scan fragments into complete labels.

In addition, the system provides novel reconstruction methods, which are capable of reconstructing label information such as undecodable characters or elements where label defects may otherwise prevent full information from being decoded. Such reconstruction methods allow for undecodable characters or elements to be reconstructed from partial information based upon known or expected structural characteristics for the particular label symbologies being decoded, as well as through the use of correlation techniques utilizing information obtained from multiple scans of a label. As well, the preferred embodiment offers stitching techniques at the character and element level to aid in the reconstruction of label information.

A means of providing for correction of information at the leading and trailing ends of a label, which might otherwise be distorted and unreadable due to mechanical aspects of the scanning line mechanism, is further provided in a preferred embodiment herein to assist in obtaining complete label information in an efficient and accurate manner. In conjunction with such system and methods as indicated above, the preferred embodiment further provides unique features, such as the use of edge strength indicators and quality measures to enhance label readability and bar code scanner decoding capabilities.

In another aspect, a preferred embodiment herein provides for systematic selection of the decoding techniques to be employed in the process of decoding particular label symbologies. To this end, any number of differently aggressive decoding techniques may be selected, either manually or automatically, to decode label symbologies.

A preferred embodiment provides for decoding of a digital representation of an input signal to be attempted at first with decoding of the part or all of the analog signal being undertaken only after a number of attempts at the digital signal prove unsuccessful. In this manner, system resources and decoding time may be saved.

The type of decoding techniques to be employed may also be set, for example, based on aggressiveness, in a preferred embodiment. In one approach, the system may be set up to attempt less aggressive, more secure, techniques (such as standard decoding techniques) first with more aggressive, less secure techniques (such as character/element reconstruction) being implemented sequentially and systematically should a label fail to be successfully decoded after a number of attempts with less aggressive techniques. Alternatively, beginning and/or ending aggressiveness level to be used may be set, by the user or otherwise, based upon the symbology to be read.

In another approach, the system may be programmed as to aggressiveness levels to be used. In this regard, a starting aggressiveness level and/or maximum aggressiveness level, or both may be programmed. It is envisioned that such programming may, e.g., be based upon user entry by of information regarding the symbology to be read.

In yet another approach, the system may be programmed to learn the aggressiveness level (e.g., starting level, maximum level, or both) to be utilized with respect to a particular group of labels. Such learning may be accomplished, for example, through scanning of an exemplary label with the scanner set in a learning mode whereby the system may assess the appropriate level of aggressiveness required to successfully decode labels of that type. As an alternative to a discrete learning mode, an ongoing learning mode approach may be implemented whereby information about the aggressiveness levels needed to decode would be constantly accumulated as the scanner operates. In accordance with such latter approach, the scanner would adjust itself automatically as label quality changed.

In a still further aspect of the present system and methods, feedback from decoding may also be used to adapt various signal processing parameters. For example, gain, threshold and other signal processing parameters may be automatically adjusted within the scanner based upon feedback from decoding in order to enhance future decodability of label information.

Through the use of the systems and methods detailed herein, the most efficient means of decoding particular labels may be identified and utilized. In turn, less time is required for the decoding process since the time otherwise required to attempt decoding which is not likely to be successful may be eliminated.

Accordingly, the present system and methodologies provide one or more of the following objects and advantages:

- to accurately recognize and decode optical labels;
- to provide multiple methodologies for reconstructing complete bar code information from partial bar code information obtained from either a single scan or multiple partial scans;
- to provide such multiple methodologies for reconstructing complete bar code information in such a manner that the methodologies are implemented in an order from most efficient to less efficient until complete bar code information is obtained;
- to provide accurate assembly of label information from multiple partial scans with confidence that the entire label has been scanned, no data has been duplicated, and the data has been put into the correct order;
- to have the capability and versatility to reconstruct labels of various formats including multi-block labels as well as single-block labels and others;
- to improve reconstruction performance by using symbology characteristics and detected label information to build up labels with a valid high level structure;
- to allow a bar code scanner to stitch label fragments that have some undecodable characters present;
- to stitch symbologies configured for variable length;
- to allow less stringent stitching requirements for fragments that are decoded from consecutive scans compared to fragments that are decoded from non-consecutive scans;
- to perform reconstruction of label information in a speedy and efficient manner while alleviating pressure on scanner operator to accurately align the labeled object;
- to increase read successes and improve accuracy of reconstruction in situations where label condition is degraded by tears, splits, folds, spots, voids, etc.;
- to provide a system and methodologies for decoding labels whereby more aggressive decoding techniques may be implemented only after less aggressive techniques fail; and,
- to provide a system and methodologies whereby the appropriate aggressiveness level to be used for decoding particular symbologies may be learned by the system.

Other objects and advantages of the present system and methodologies will become apparent from a review of the accompanying drawings and the detailed description that follows.

BRIEF DESCRIPTION OF THE DRAWINGS

FIG. 2 is a flow chart diagram illustrating exemplary functional blocks for decoding with character reconstruction in accordance with the system and methodologies herein.

FIGS. 7, 7A, 7B comprise a flow chart diagram illustrating a portion of the functional blocks of an exemplary element level processing with quality measuring routine in accordance with the system and methodologies herein.

DETAILED DESCRIPTION OF THE PREFERRED EMBODIMENT

The preferred system and methodologies provided herein utilize Element Level Processing as well as Character Level Processing as a basis for the reconstruction and decoding techniques provided.

Element Level Processing

Figure 1A:
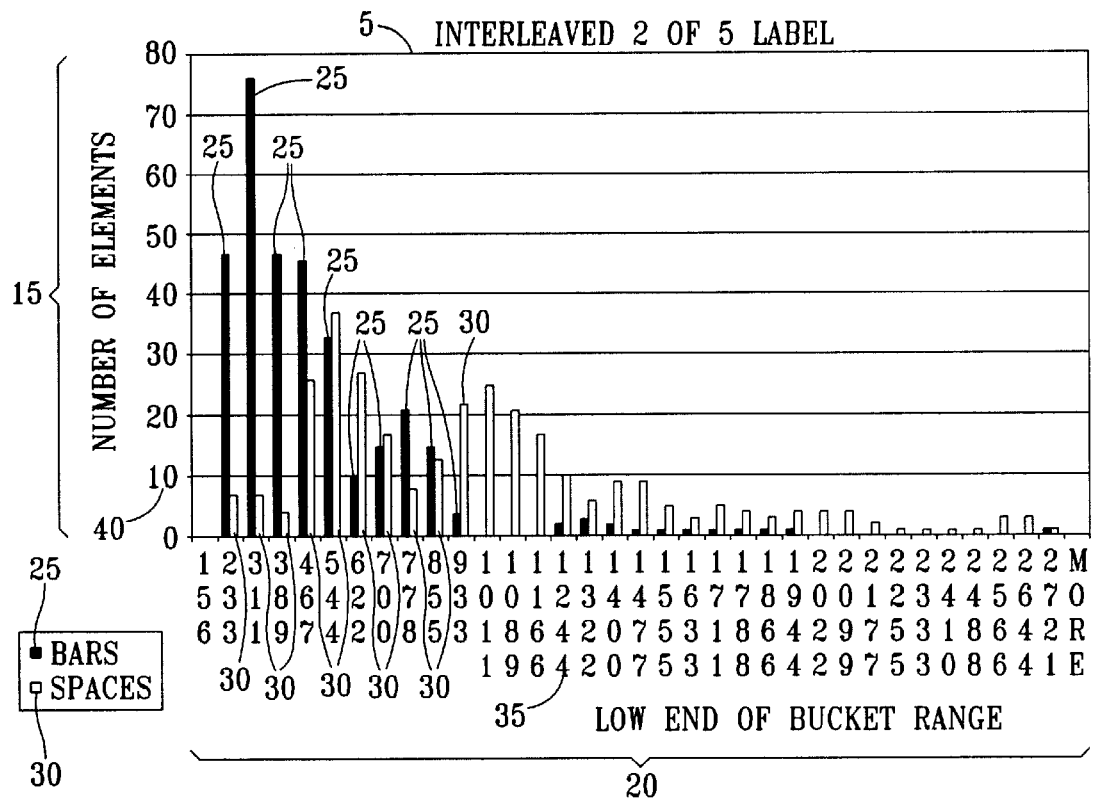
FIGS. 1A and 1B are graphical representations illustrating exemplary Element Width Histograms for an Interleaved 2 of 5 Label and UPCA Label, respectively, in accordance with an aspect of the system and methodologies herein.
Figure 1B:
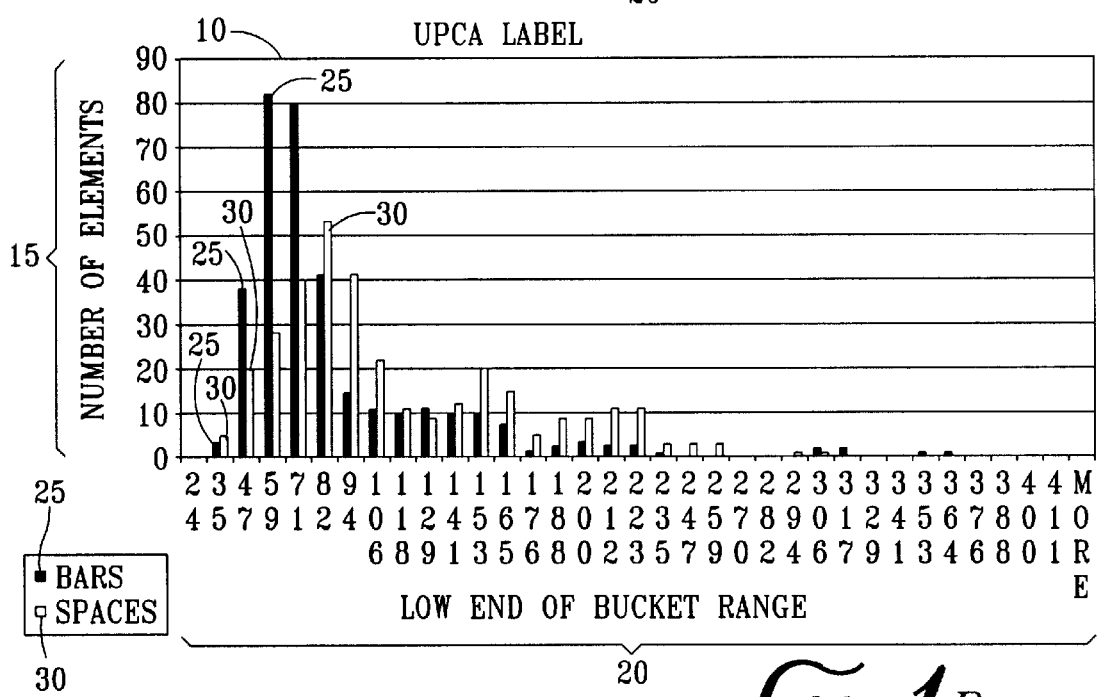

Element Level Processing is accomplished in an aspect of the preferred embodiment through the use of an Element Width Histogram, as illustrated in FIGS. 1A and 1B and described hereinbelow, wherein the widths of the elements of a bar code are captured in a data store on a width basis. The bar code scanner may be enabled to maintain histogram information for a number of potential labels. Such information may, for example, be utilized in order to aid in the decoding of poor quality labels. It is envisioned that separate histogram information may be kept for bars and spaces of each potential label and that information may be collected and maintained for a number of label scans. As further detailed throughout this specification, such histogram information may be used to determine the number of element widths in the label as well as average element widths. In addition, such histogram information may be helpful in determining symbology, i.e., for example, whether a particular label being scanned comprises a binary or a multi-width symbology.

Optionally, the scanner may further capture edge confidence levels along with element edge times. Typically, bar code scanners collect only edge timing information that may then be utilized to determine, for example, element widths. However, use of edge timing information alone may limit the ability of such scanners to decode poor quality labels whose edges may be distorted. While other scanners may exist that collect edge strength information as well, these scanners typically involve making multiple passes through the data at different threshold levels using standard decoding algorithms.

As provided further hereinbelow, label reconstruction decoders may include an edge-matching algorithm, which may be invoked when attempting to decode poor quality labels. When bar code data is not decodable using a standard decoding algorithm, this algorithm will attempt to determine the encoded character based upon the edge timing information. In a further aspect of the preferred systems and methods herein, edge strength information may be collected for use in conjunction with the reconstructive decoding algorithms and may be made available to the edge-matching algorithm, thus increasing the probability of correctly decoding the character in question. Such technique would require only a single pass through the data, using more sophisticated reconstructive decoding algorithms, thus being more efficient and increasing the probability of correctly decoding the bar code with fewer scans of data. In turn, the ability of the bar code scanner to decode label data that may not be decodable using standard decoding algorithms may be improved.

Edge strength, or confidence levels, for each element may be determined through many methods. One confidence indicator is the first derivative strength of the return laser signal. Edge confidence level information can also be used to calculate an average edge confidence level for the common elements of the label. The average edge confidence level may be calculated for binary and multi-width symbologies using the edge confidence levels of the element widths selected for binary and multi-width symbologies, respectively.

It is noted that edge confidence level information may be advantageously utilized at different points in the scanning and decoding process. Such edge confidence level information may further advantageously be generated in different ways at the different points in the process. For example, when generating the histogram, the confidence level of an element might be simply the comparison of that element's edge strength with average element edge strength. In the decoders, though, the confidence level of an element might be the product of the deviation of an element's width from a target and the deviation of an element's edge strength from a target. In the correlation and stitching process, the confidence level of a character might, in turn, be the sum of the confidence levels of the individual elements. Still further variations of generating confidence levels may be envisioned by one skilled in the art.

Further in regard to the use of information that may be obtained through the histogram analysis as set forth herein, the number of element widths may, for example, be utilized in determining the symbology that is being scanned so that the correct symbology specific decoder may be executed. Alternatively, the number of element widths may provide the means for rating enabled symbologies to be executed in order as further detailed herein. The average element widths may, for example, be utilized to help find characters and/or start/stop patterns in poor quality labels and/or to set acceptable ranges for element widths within the label. The average edge confidence level may, for example, be utilized to help identify the significant edges of the label and to filter out noise edges in the label.

The number of elements in a given range of widths is stored. The total sum of the widths in a given range may also be stored. In establishing the histogram parameters, a minimum range for element widths may be determined, for example, by using ¼ of a narrow element in the start/stop pattern. As indicated previously, histogram information may be maintained for a number of potential labels. In such case, a separate histogram is kept for bars and spaces of each potential label. Upon commencement of collection, histogram information is collected for sets of label scans, e.g., each set of four label scans.

In accordance with a preferred embodiment, the histogram analysis comprises three primary steps: gathering the element width data and, optionally, confidence level information for the element edges; finding the peaks in the histogram; and, decoding the peaks in the histogram. A representative overview of the histogram information that may be maintained in accordance with a preferred embodiment herein may be understood as follows. As noted, histogram information may be maintained for a number of potential labels. The histogram may be envisioned as having a series of buckets wherein each bucket represents elements of a particular range of element widths. It is intended that the series of buckets in the histogram cover the possible element widths for a particular potential scanned label. Separate histograms may be kept for bars and spaces of each potential label. Several scans of a potential label may be combined in the histograms to provide a larger set of elements for the histograms.

With respect to the first step of gathering element width data, the quiet zones of a potential label are first identified, e.g., in accordance with known methods. Then, when the elements of a potential label have been identified, the element width data is gathered and the element widths are added to the histogram. If enabled, as indicated above, optional confidence levels may also be added to the histograms. The histogram information is updated with the number of elements in each bucket of the histogram, as well as the total sum of all elements in the bucket. Thus, the histogram information may include, for example, the number of elements in each bucket, the total sum, optionally the edge confidence level of the elements in each bucket, and the element width range for each bucket.

In addition to application as detailed above, confidence level information may further be utilized as a filter to help determine which data is accepted into the histogram. For example, elements of a potential label may be identified and the average edge strength of such elements may then be determined. If the edge strength of any particular individual element being examined for addition to the histogram is not within a calculated tolerance of the average edge strength, that element would not be included into the histogram. In this manner, the confidence that the histogram would be generating accurate information for use in later processing is increased.

FIG. 1A provides an exemplary graphical representation for an Interleaved 2 of 5 Label histogram 5 and FIG. 1B provides an exemplary graphical representation for a UPCA Label histogram 10. The histograms 5 and 10 record information regarding the number of elements 15 within enumerated ranges of element widths 20. It is noted that the histograms 5 and 10 illustrate the low end of element width ranges and that additional ranges that are not shown may include additional information. Further, the values that are indicated for the range of element widths 20 represent the lower value of that corresponding range (thus, the value 156 is shown below the range which is from 156 through 232). As may be seen from FIGS. 1A and 1B, separate bar information 25 and space information 30 is gathered, maintained and recorded. By way of example, it may be seen that the space information 30 for the Interleaved 2 of 5 label histogram 5 shows that with respect to the 1244 range 35 the number of elements 15 is recorded as a 10 value 40. Thus, 10 space elements falling within the 1244 range 35 have been recorded and identified in relation to Interleaved 2 of 5 label scans by the system.

With respect to the second step of finding peaks in the histogram, a first preferred method is to generate 2-bucket sums of the number of elements in the buckets for the bar and space histograms. The 2-bucket sums are then searched to find all peaks and an average element width is calculated for each peak. Peaks may then be selected by choosing all 2-bucket sums that are greater than both neighboring 2-bucket sums. If there is a set of 2-bucket sums that are equivalent but greater than the 2-bucket sums neighboring the set, the middle bucket of the set may be selected as a peak. Alternatively, a second method utilizes the confidence levels of elements as indicated above, instead of the number of elements, and follows the same steps described above in relation to 2-bucket sums to identify peaks in the histogram information.

While alternate preferred methods for finding peaks in the histogram are set forth above, it is noted that many other possible methods for finding histogram peaks may be envisioned and implemented without departing from the spirit and scope of the systems and methods as set forth herein.

With respect to the third step of decoding peaks of the histogram, the average element width for each peak is calculated and stored. Element averages of the peaks and their relative spacing, the number of elements in the peak, and the similarities between bars and spaces may be utilized to determine which peaks could represent the element widths for the label. Based on the results obtained, the type of symbology may be identified as binary, multi-width, or unknown. Thus, the peaks may be decoded to determine the ones that represent binary and/or multi-width symbologies.

Peaks of the histogram may be decoded by matching element widths of the peaks with potential element widths for either binary or multi-width symbologies. Wide to narrow ratios of element widths may, for example, be used to find such match. A further component of such match may be which element widths are the most common in the histogram or which element widths have the largest confidence level. A still further component of such match may be which element widths are common to both the bar and space histograms. The consistency of bar and space element widths and the number of unused histogram peaks may be used to determine the quality of the identified element widths as either binary element widths or multi-width element widths. The quality of the element widths may, in turn, help to determine the type of symbology.

With reference back to FIGS. 1A and 1B, the manner in which the histogram information may yield a determination of the type of symbology (binary or multi-width) may be understood through the following example. To determine if a binary symbology is represented by a histogram, the biggest peaks for bars and spaces are considered.

The Interleaved 2 of 5 Label histogram 5 of FIG. 1A represents a binary symbology. Considering the two biggest peaks of the Interleaved 2 of 5 Label histogram 5 of FIG. 1A, the biggest bar peaks are approximately at widths 349 and 816. The biggest peaks for spaces are at widths 582 and 1049. By observing that the 349 bar peak is close to the 582 space peak and the 816 bar peak is close to the 1049 space peak, it may be determined that the 4 peaks are very good candidates of a binary symbology. In addition, the difference in widths of the bars (816−349=467) is very similar to the difference in widths of the spaces (1049−582=467). Another observation is that the wide to narrow ratio of the bars (816/349=2.3) and spaces (1049/582=1.8) are similar to each other and are within acceptable tolerances (i.e., 1.5 to 5.0) for binary symbologies.

The consideration of multi-width symbologies follows a similar approach. However, for multi-width symbologies there are normally 4 widths that have width ratios of 1:2:3:4 for width1:width2:width3:width4. The comparison between two widths in a binary symbology must be extended to three or four widths in a multi-width symbology. At least the first 3 widths of a multi-width symbology are normally required to be represented by peaks in the histogram for a multi-width symbology to be detected.

If only a binary symbology is detected, a binary symbology is the result. If only a multiwidth symbology is detected, a multi-width symbology is the result. If both a multi-width symbology and a binary symbology are detected, a multi-width symbology would be the result because width1 and width2 of a multi-width symbology looks just like a binary symbology.

In a further aspect, the use of variable element congruence may allow a range to be set for each element size, may be utilized with respect to either binary or multi-level codes, and may allow the decoder to be adjusted for aggressiveness vs. adherence to specification. The use of variable element congruence may better be understood as detailed hereinbelow.

A typical method of decoding bar codes is to compare each element width with a set of thresholds to create a normalized set of element widths that may then be compared against tables of valid characters for that symbology. The thresholds for each normalized element size determine the degree of congruence of the elements accepted as that width. By varying these thresholds, it is possible to allow the decoders to be more aggressive at the risk of increased misreads, or to be more conservative but at the risk of not reading some labels of marginal quality. For example, when decoding Code 39, possible narrow element widths for one character could be 77, 85, 98, 105, 110 and 122, while wide elements widths could be 273, 298 and 312. Thresholds that would correctly decode this character could be 70 to 130 for narrow elements, and 270 to 330 for wide elements. However, this character has a wide to narrow ratio that is greater than allowed according to the specification for this symbology. Therefore, adjusting the thresholds such that this character would decode also increases the likelihood of decoding errors. Because of this, the option of adjusting the thresholds for aggressiveness versus adherence to specification, as further detailed herein, could be made accessible to the user, and implemented as needed according to knowledge of the quality of labels being scanned.

Upfront Symbology Determination

Determining the correct symbology or eliminating symbologies up front can result in minimization of the decoding and reconstruction time. The preferred embodiment attempts to determine the symbology type as the label data is being collected. To this end, one or more of the techniques identified below may be used to determine the symbology type after leading and trailing quiet zones have been identified. It is envisioned that the likelihood of a specific symbology type(s) may also be configured by the customer or otherwise to aid in symbology determination.

1. Looking at the start and stop pattern of potential labels and comparing such patterns to those of known enabled symbologies.

2. Using the element width histogram to determine if the symbology is binary or multiwidth as detailed hereinabove.
3. Looking at the number of elements in potential labels to determine if it is a possible length for specific enabled symbologies.
4. Determining which symbologies could have a label of the length, e.g., in time, observed in the potential label.
5. Using the element counts determined by the histogram and the total count for the entire label to calculate the length for comparison to a specific enabled symbology.
6. Looking at the number of characters that were decoded in previous scans (in which case characters from some symbologies may be assigned more weight than others, or symbologies with the most decoded characters may be assigned a higher weighting than other symbologies).
7. Using the average element widths determined by the histogram to determine if the time count of the entire label accommodates the start, stop, and a number of character widths for a specific enabled symbology.
8. Using historical reading patterns to weight the probable symbology to read.
9. Identifying the number of labels historically decoded for each enabled symbology.
10. Utilizing character equality checks.

In accordance with the preferred system and methods herein, the bar code scanner attempts to determine the symbology type after leading and/or trailing bars of a label or label segment have been identified. Potential symbologies of the label data are identified and ordered, e.g., with the most probable ones first, using a variety of the above and other indicators as further described hereinbelow. The potential symbologies are ordered with the most probable ones first so that the symbology decoders with the highest chance of success may be executed first. It is envisioned that in some cases the symbology decoders for the lowest probable symbologies may optionally not be executed at all. Such operation allows the scanner to spend more time decoding the label data for specific symbologies compared to previous scanners where decoding of each enabled symbology was attempted for every set of label data. Particularly with respect to poor quality labels, the determination of the symbology allows the scanner to spend more time decoding the poor quality label with the correct decoder and skip some of the decoders that have a minimal chance of success. Such operation further allows the scanner to discard some label data if none of the indicators show a probable symbology.

In accordance with the preferred embodiments herein, the bar code scanner determines ratings from each indicator for each symbology type. The ratings are then accumulated for each symbology and are put in order (e.g., highest ratings to lowest ratings). The decoders from the symbologies with the highest ratings are executed first. The decoders from symbologies with the lowest ratings are executed last or, as indicated previously, may not be executed at all.

The indicators envisioned by the present system and methods include: start/stop pattern, element width histograms, number of elements in label, length of label in time, number of labels decoded for each symbology, number of characters decoded in previous scans for each symbology, and character equality checks. The manner in which each indicator may be utilized in accordance with a preferred embodiment herein is further described below. It is noted that multiple indicators may be used to determine the symbology of poor quality labels.

With respect to the start/stop pattern, the templates for the start and/or stop patterns of enabled symbologies are compared against the leading and trailing bar and space elements of the label. The template comparison may allow for missing elements, extra elements, and elements that may be the wrong size. The symbologies with start/stop patterns that match the best will have the highest rating.

With respect to element width histograms, ratings from the element width histogram, as detailed above, may be utilized to provide an indication of which symbologies are the most probable.

With respect to the number of elements in the label, the number of elements in the label may be matched against the set of possible numbers of elements for each enabled symbology. A rating for each symbology results. It is noted that this indicator will be accurate when there are no spots or voids in the label.

With respect to the length of the label in time, the element width histogram may be utilized to determine the element widths of the label. The character length and start/stop pattern length for each symbology may also be determined using the element widths from the histogram. The length of the label in time will be compared against the possible combinations of character lengths and start/stop pattern lengths for each enabled symbology to determine if the label is a correct length for each symbology. The closeness to a correct length may be used to determine the rating of each symbology for this indicator.

With respect to the number of labels decoded, the number of labels that have been decoded for each symbology may be used to determine a rating of each symbology.

With respect to the number of characters decoded in previous scans, such number of characters decoded may be used to cause a rating to be generated for each enabled symbology indicating the most probable symbology for future scans of the correct label. To this end, as the scanner decodes data from scan lines it will keep track of the number of characters decoded in each enabled symbology.

With respect to character equality checks, the bar code scanner may check for character equality across a portion or all of the label data for each enabled symbology. A rating for each enabled symbology may be generated based on the character equality results.

One method of implementing indicator ratings for symbology detection is to set each indicator to generate a result from 0 to 99 for each symbology wherein, for example, highest numbers indicate highest probabilities and lowest numbers indicate lowest probabilities. In addition, each indicator will have a weight, for example, from 1 to 10 for each symbology. To determine the symbology with the highest probability of success, a result will be generated for each symbology by obtaining the sum of the products of each indicator result and its corresponding indicator weight.

Implementation of indicators to determine symbology type may be better understood through the following exemplary illustration. For purposes of such example, a system utilizing start/stop patterns, the histogram, and number of elements as indicators of symbology type may operate as follows. First, with respect to each indicator that is utilized, a weighting factor is established and set for that indicator in relation to each potential enabled symbology, respectively. Thus, with respect to start/stop patterns, a weight of 2 for a UPCA symbology and 10 for a Code39 symbology may be assigned. With respect to the histogram, a weight of 8 for a UPCA symbology and 5 for a Code39 symbology may be assigned. With respect to the number of elements, a weight of 4 for a UPCA symbology and 2 for a Code39 symbology may be assigned. It is further assumed that both the UPCA and Code39 symbologies are currently enabled in the system of this example.

When a section of label data is being considered, the results of the various indicators are generated and analyzed. The following results are assumed to have been generated for the various indicators in relation to the UPCA symbology and the Code 39 symbology. With respect to UPCA:start/stop pattern=40, histogram=75, and number of elements=20. With respect to Code39: start/stop pattern=60, histogram=40, and number of elements=40. Accordingly, the sum of products for UPCA is: 760 (i.e., 2*40+8*75+4*20) and the sum of products for Code39 is: 880 (i.e., 10*60+5*40+2*40). Such symbology detection would indicate that the Code 39 symbology is the best choice with the UPCA symbology being the second choice for a symbology. It may be readily seen that the above example may be expanded to include additional indicators, as identified above, and/or that additional symbologies may be enabled and included in the symbology determination.

Character Level Processing

In accordance with the systems and methods herein, the scanner decodes as many characters of a bar code as possible from a single scan of the label. However, some characters may not be decodable due to a poor quality or damaged label, or as a result of the laser beam exiting the area of the label during scanning. If the scanner cannot decode a character, it advances to the next decodable character in the scan line to continue decoding.

As utilized herein, the following terms are defined as:

A Full Length Label is one that has been decoded over its entire, known length.

A Fragment is a label that has been decoded over part of the entire length.

A Label comprises either a Full length label or a Fragment.

A Decoded Character is a character that has been successfully decoded within a Label.

An Undecodable Character is a character which has not been successfully decoded, e.g., due to defects in the label at the location of such character that prevent decoding.

An Undecodable Character Identifier is a special identifier that is set with respect to an Undecodable Character(s).

Stored Labels are Fragments and Full Length Label characters that are stored during the processing of Labels. Additionally, a store is established for each character position to store the number of scans that have included the stored character.

A Correlation Store is a store for all Full length labels and Fragments that are candidates for correlation when new labels are processed. In one embodiment, a separate correlation store may be established for a left Fragment and a right Fragment in each symbology. Alternatively, a list of Labels could be implemented such that the list comprises Labels that could be merged with a new Label. In such latter instance, sufficient storage is provided for Labels in the list that won't merge.

Merging Length is the number of characters that will be merged when Fragments and Full length labels are merged.

Variable Length is an attribute of some symbologies that have Labels with lengths in a certain range. This set also includes variable length symbologies that have been configured in the scanner to have a limited range of lengths.

Fixed Length is an attribute of some symbologies where there is only one possible length of the label. This set also includes the variable length symbologies that are configured in the scanner to read only a certain number of lengths.

Overlapping Region is the section at the end of each Fragment that overlap in the stitched label when two Fragments are being considered for stitching.

Matching Decoded Characters are the characters of the Overlapping Region that match in value and position in each Fragment when two Fragments are being considered for stitching.

Non-Matching Decoded Characters are the characters of the overlapping region that are not Matching Decoded Characters in each Fragment when two Fragments are being considered for stitching.

Character Equality, Reconstruction, Correlation and Stitching

Character Equality (i.e., Does Character have Correct Width?)

Character equality is further utilized by a preferred embodiment in the process of reconstructing Undecodable Characters. When decoding a label, the decoder steps through the label data a character at a time. In accordance with one aspect of the system and methodologies herein, the character width, instead of the number of elements, is used to find the next character. The expected character width can be determined, e.g., by using the previous character width, or a multiple of a previous element width, or a multiple of the widths identified by the histogram. If there is not a bar-to-space or space-to-bar transition at the expected location, the decoder may be set to assume a transition and attempt to decode a character. Alternatively, the decoder may skip to the next expected character boundary and look for a transition prior to attempting a character decode or reconstruction.

When checking for character equality, the number of elements required to match the previous character width is determined. If this number is not correct, then it is determined that some of the elements are corrupted and the character cannot be decoded as it is. For example, a Code 39 label requires nine (9) elements to match the width. Thus, if the number of elements identified with respect to the undecoded character is not nine (9), then the character cannot be decoded as it is and some reconstruction technique must be utilized to determine the value of the undecoded character.

At an element level, the system and methodologies herein may determine whether or not the pattern of bars and spaces in a particular character being decoded match a pattern in the valid character set.

Character Reconstruction

In accordance with a further aspect of the system and methodologies herein decoding of poor quality labels through reconstruction of normally undecodable characters is provided. To this end, scans in which an individual character containing a corrupted element(s) are identified, and which might otherwise result in the entire scan being discarded, may be identified and decoded by reconstructing the originally intended element widths and structure from the corrupted data. Thus, in situations wherein either the expected number of elements for a character, or the expected range of widths for each element of a character, is violated (e.g., as a result of an individual element being split into multiple pieces, multiple elements being merged into a single piece, or the width of an element being distorted beyond specified boundaries), the system and methodologies accept such undecodable character among other decodable characters and, through knowledge of the width of the total character, and the specifics of the symbology, determines expected widths for the elements in the character. By comparing the actual element widths against the expected widths, it may be possible to determine which elements may be in error, and what the most likely intended widths and structure of those elements may be. The element widths and structure may then be reconstructed and the reformed character decoded. One advantage of this technique over others is that it allows a label to be decoded from a single scan of data, while other similar concepts require multiple scans of data for comparison.

Character reconstruction is accomplished, e.g., by ordering the width of the elements of a character. The number, placement, and size of wide and narrow elements may be used to determine which elements should be combined or adjusted to make a valid character for a specific symbology. Alternatively reconstruction may be accomplished through comparison of the bar-space pattern of the undecodable character against all possible characters for the symbology. A measurement of the comparison identifies the closest match. This measurement is then stored across scan lines with the character correlation information. When the closest character is seen a number of times, it is accepted. The measurement method could be the total count error in the comparison of the character's bar-to-space and space-to-bar transitions to that in the collected data. If there are extra transitions in the collected data, they are ignored because they are probably spots or voids.

The flow diagram of FIG. 2 illustrates exemplary functional blocks for decoding with character reconstruction in accordance with the system and methodologies herein. As illustrated in FIG. 2, the system first checks, at step 1 45, to determine if a character in question has the correct number of elements. If it does, then the system checks, at step 2 50, whether the pattern of those elements match a character. If so, then the system proceeds to step 7 55 to store the character value and complete the processing at step 8 60. If the correct number of elements is not identified at step 1 45, then category thresholds are set based on the character width at step 3 65, elements are sorted into the categories at step 4 70, and the elements are reconstructed according to specified rules at step 5 75. After such processing, the system then checks whether the new element pattern matches a character at step 2 50. If so, that character value is stored at step 7 55 and processing is completed at step 8 60; if not, an Undecoded Character Identifier is stored at step 6 80 and processing is completed at step 8 60. Further exemplary aspects of possible reconstruction methodology operation are detailed hereinbelow.

It is further envisioned that many different rules may be applied to a reconstruction character with the different rules being weighted for later choosing. Alternatively, one kind of reconstruction may be assigned to be performed on a given label based upon an assumption that such label is likely to have a single type of problem, or to be amenable to a particular rule of reconstruction. For example, if one character can not be decoded but a check digit is available, the check digit may be utilized to reconstruct the missing character. As well, moving edges may be classified at a different level than eliminating or adding edges.

With reference to reconstruction of a Code 39, an exemplary reconstruction methodology includes a first step of determining which elements in the character are corrupted. To this end, category thresholds may be calculated and set, based on character width, to allow the elements to be categorized as valid or invalid. For example, and with reference to FIG. 3 which illustrates a sample low density thermal printed Code 39 label 85 with gaps and voids 90, to allow the wide to narrow ratio to be a value between 1.7 and 4.0, the thresholds for a label element would be set at CW/18–CW/11 for a narrow element and CW/11*1.7–CW/18*4 for a wide element, where CW=character width. Elements are then sorted into the categories by comparing each element in the character with the thresholds; the elements are then sorted into the different buckets. For example, in Code 39 the different buckets could be established as: TN=Too Narrow; N=Narrow; NNE=Not Narrow Enough; NWE=Not Wide Enough; W=Wide; and TW=Too Wide. The appropriate rule set may then be applied to the results of the sorting to reconstruct the elements. For example, TN+TN+NWE=W. If the reconstructed element does not match a valid character then an Undecodable Character Identifier marker, as further described hereinbelow, is stored in the buffer and processing continues.

Figure 3:
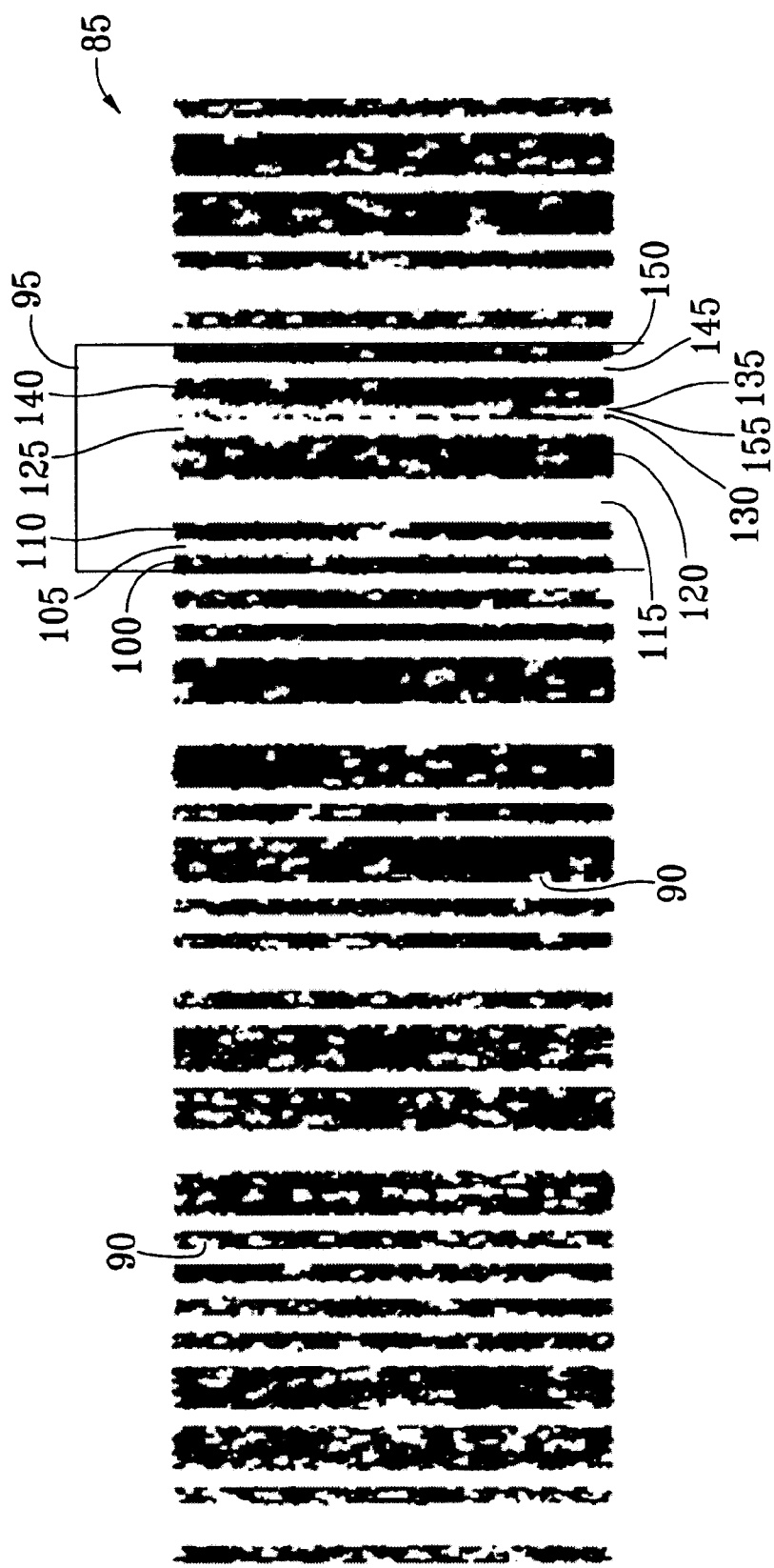
FIG. 3 illustrates an exemplary poor quality label upon which an aspect of the character reconstruction methodologies herein may be advantageously implemented.

For the character outlined in FIG. 3, the element values with respect to the label section 95 are:

594 592 590 1449 1410 625 210 237 1009 576 570 and the Character Width is 7862. Using the thresholds defined above for Narrow and Wide elements, the following thresholds are calculated to be:

Narrow=436–714

Wide=1215–1747

Sorting the eleven "elements" (i.e., "element" a 100, "element" b 105, "element" c 110, "element" d 115, "element" e 120, "element" f 125, "element" g 130, "element" h 135, "element" i 140, "element" j 145, and "element" k 150, of the label section 95) using the above thresholds yields:

N N N W W N TN TN NWE N N

Applying the rule TN+TN+NWE=W the character is reconstructed as:

N N N W W N W N N which can then be correctly decoded. Thus, it may be seen that the above character reconstruction process results in combining "element" g 130, "element" h 135, and "element" i 140 as a single bar element that has been reconstructed to ignore the gap 155 which would otherwise have erroneously been identified as "element" h 135.

In accordance with further aspects of the system and methodologies herein, edge matching, element filling, and element splitting may be utilized in character reconstruction of poor quality labels. As indicated previously, reconstruction allows the scanner to read poor quality labels with data from one scan line so the reading speed is faster. The decoder attempts to decode each label of a character. If a character cannot be decoded using standard decoding techniques, e.g., as a result of a poorly printed, distorted or worn label, then the following exemplary methodology may be utilized to reconstruct the character. The steps of the exemplary reconstruction methodology include: identifying the character elements, finding matches between element edges and character templates, filling appropriate elements, and splitting appropriate elements. The steps are described in the following pages. The flow diagram of FIG. 4 illustrates the exemplary functional blocks of one implementation of character reconstruction in accordance with system and methodologies herein.

Figure 4:
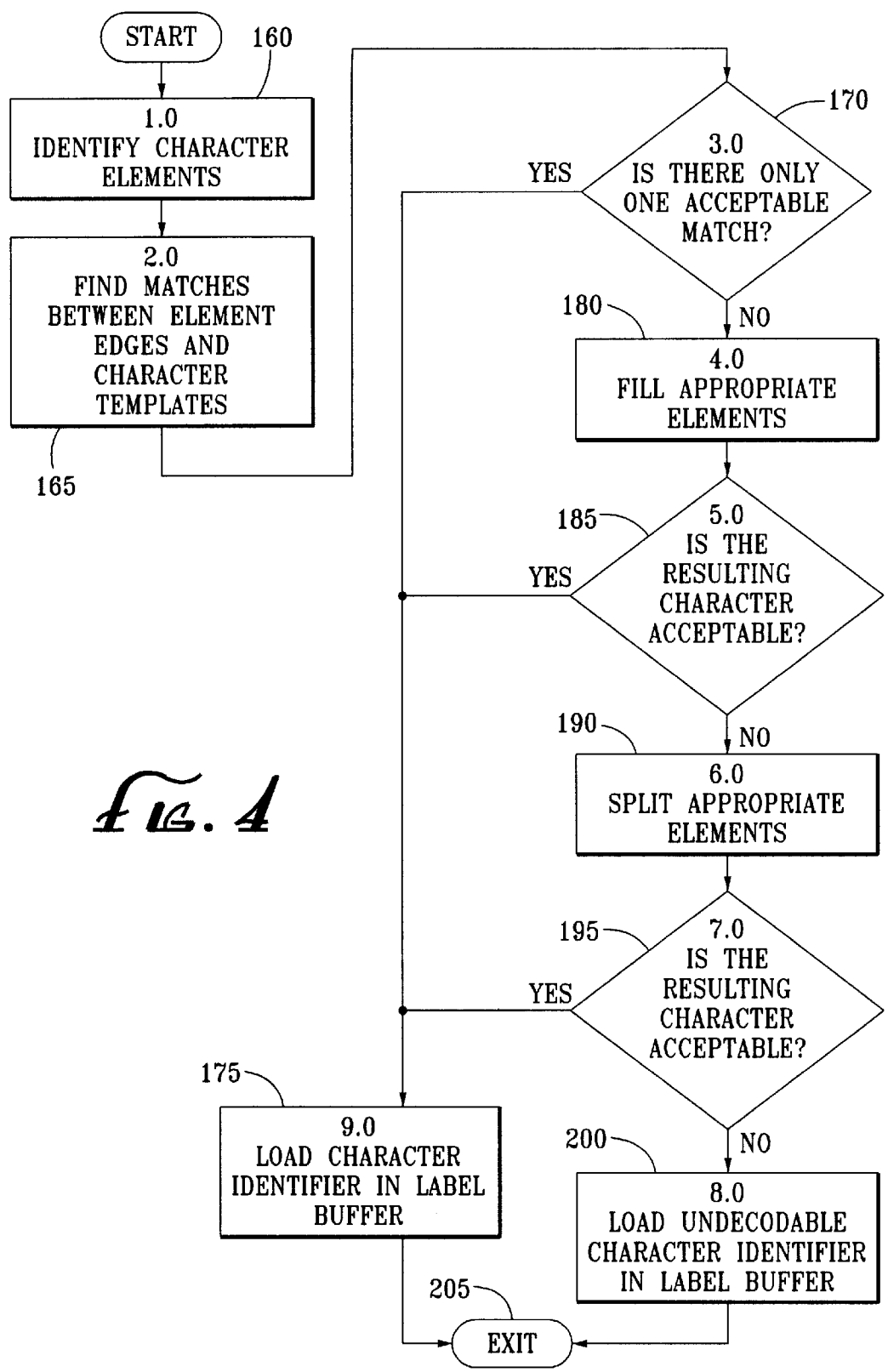
FIG. 4 is a flow chart diagram illustrating further exemplary functional blocks of one implementation of character reconstruction in accordance with system and methodologies herein.

With reference to FIG. 4, character elements are identified in a first step 160. To this end, the decoder uses the first few elements of a label, or historical information, to determine the character width for a new character. The character width is used to identify the element edge of the new character that is closest to the element width. If the character width of the new character is different from the original estimate by more than a specified amount, the data of the new character is adjusted at the character boundary to correct the error. By way of example, the characters of the UPC symbology are comprised of a fixed number of modules with each module width being a known specified fraction of the character width. When decoding such symbology in accordance with the approach herein, if a decoded character is found to vary in width from the previous character by more than 1 module width, the character boundary may be adjusted by the appropriate amount to restore the overall character width to the correct number of modules.

In a second step 165, once the character elements are identified, the system attempts to find matches between element edges and character templates. For this purpose as well, the decoder uses the first few elements of a label, or historical information, to determine the expected element widths for all possible element widths of the current character. The expected element widths are used to expand the normalized templates for all characters of the symbology. A comparison is made between each character of the symbology and the current character. The distance between the element edges of the current character and the expanded templates are used to determine which symbology characters are the closest match to the current character.

In a third step 170, the system determines whether or not there is only one acceptable match between element edges and character templates. If so, there is only one symbology character that is within a satisfactory amount of difference from the current character. Thus, that match is accepted and the corresponding character identifier is loaded into the label buffer (as provided in step nine 175 below). Character reconstruction is then complete and the system exits the routine at the exit step 205. If there was not only one acceptable match between element edges and character templates, then there may be multiple symbology characters that match the current character and the system proceeds to step four 180.

In the fourth step 180, the system attempts to fill appropriate elements. For example, if there are more element edges than are required by this character, the system determines which element to change from a bar to a space or a space to a bar. When one element is switched, two element edges are removed. To this end, several rules may be utilized to guide the decision about which element to switch. For example, a first rule may be that the decoder should give a higher priority to changing a narrow space to a bar than changing a narrow bar to a space. As well, a second rule may be that the decoder should give a higher priority to changing very narrow elements compared to changing wider elements. It is envisioned that other rules may be readily devised and employed with a mind toward specific symbologies to be decoded. Once changes are determined and completed, the system then proceeds to step five 185.

In the fifth step 185, the system determines whether or not the character resulting from the fill operation changes made in step four 180 is acceptable. To this end, the decoder checks for a match with symbology characters. If the character with filled elements matches a symbology character, then that match is accepted and the corresponding character identifier is loaded into the label buffer (as provided in step nine 175 below). Character reconstruction is then complete and the system exits the routine at the exit step 205. If the character with filled elements does not match a symbology character, the system proceeds to step six 190.

In the sixth step 190, the system attempts to split appropriate elements. For example, if there are not enough elements for this character, one or more of the elements must be split. Various information and rules may be utilized to guide the decision about which element(s) to split, including: the type of elements of a character in the current symbology; the type of elements of the current character; and/or the elements that are not within a certain range of a valid element widths. It is envisioned that other criteria may be readily devised and employed with a mind toward specific symbologies to be decoded. Once changes are determined and completed, the system then proceeds to step seven 195.

In the seventh step 195, the system determines whether or not the character resulting from the split operation changes made in step six 190 is acceptable. To this end, the decoder checks for a match with symbology characters. If the character with split elements matches a symbology character, then that match is accepted and the corresponding character identifier is loaded into the label buffer (as provided in step nine 175 below). Character reconstruction is then complete and the system exits the routine at the exit step 205. If the character with split elements does not match a symbology character, the system proceeds to step eight 200.

In the eighth step 200, the system has determined that an acceptable character could not be reconstructed. Accordingly, the Undecodable Character Identifier is loaded into the label buffer. Character reconstruction is then complete and the system exits at exit step 205.

In the ninth step 175, the instant system has determined, from either step three 170, step five 185 or step seven 195, that an acceptable character could be reconstructed. Accordingly, the appropriate identifier for that character is loaded into the label buffer. Character reconstruction is then complete and the system exits at exit step 205.

Character Correlation and Stitching

In accordance with a still further aspect of the system and methodologies herein, character correlation across several scans is provided. Utilizing such techniques, character information from multiple scans are merged without requiring overlap as in past practices. As in the case of reconstructing single scan lines above, where multiple scan lines are merged using the character correlation techniques herein, the scanner decodes all of the characters in the label that are of good quality, while poor quality characters are skipped to be reconstructed after merger rather than thrown out. Thus enabling decoding of poorly printed labels.

As indicated previously, poorly printed labels may have spots and voids. It may also be difficult to capture the entire label in one scan line. Using the character correlation techniques herein, multiple scans may be used to assemble all characters of a label with no overlap of label information required and even when no single scan has enough information to decode all characters of the label. To this end, the position of the character in the label may be used to correctly assemble the characters, and repetitive scans of character information may be used to validate the label. As above, undecodable characters are skipped over with decoding of further label data continuing.

Decoded Characters and their position may be stored in a correlation store. Further, an Undecoded Character Identifier may be used for characters that cannot be decoded. Additional scan lines are decoded in the same way. Decoded characters from the additional scans may be merged with the data in the correlation store in accordance with techniques herein. When each character of the label is seen in the same location a specified number of times, e.g., at least two (2) times, the complete label is made available for final verification. Such merging of character data from multiple scans of a label is referred to herein as character correlation.

Character correlation is utilized when a complete label may otherwise be decoded except that it is missing one or more characters. In situations where repeated scans of the same label result in different characters being missed, the characters decoded may be correlated across multiple scans with some degree of repetition in the same location to create a complete label. This could also be thought of as stitching on a single character basis with no overlap required. Utilizing character equality boundaries of bars and spaces, the elements of undecodable characters could be skipped. The correlation is implemented by keeping track of the number of times a character has been seen. If a different character begins to be decoded, the number of reads is decremented until it reaches zero. Then the new character takes over the position.

If a certain number of characters are different from one scan to the next, the first scan may be thrown out and that next scan saved for further processing. Alternatively, both scans may be saved with that next scan being saved in a separate data store than the first. It is also envisioned that read requirements may be adjusted to account for situations involving high risk reconstruction.

A decoder may decode both Full Length Labels and Fragments. In another aspect of the system and methodologies herein, the combination of character correlation and stitching is implemented. A left fragment correlation store and a right fragment correlation store may be established as to each symbology, as appropriate, to store the characters of the fragments and the number of scans that each character has been seen. Full Length Labels may be stored in the left fragment correlation store under such scheme.

After the first label is stored in the correlation store, new labels may be merged with the stored label, i.e., Decoded Characters may be merged into the Correlation Store. To this end, the number of scans are stored for each character and each character of the new label is compared to a character of the stored label in the corresponding location. The following logic is used after comparing a character of the new label (new character) with a character from the stored label (stored character):

IF new character is not an Undecoded Character Identifier
    IF new character is equivalent to the stored character
        Increment number of scans for the stored character
    ELSE new character is different than the stored character
        IF number scans for stored character is greater or equal to 1
            Decrement number of scans for this character by 1
        ENDIF
        IF number of scans for this character is 0
            Replace the stored character with the new character
            Set number of scans for this character to 1
        ENDIF
    ENDIF
ENDIF A stored label may be replaced with a new label if the new label is a complete scan and the length of the new label is different from the stored label. Alternatively, or additionally, a stored label may be replaced with a new label if the number of Decoded Characters in the new label that are different than the Decoded Characters of the stored label represent more than 50% of the label length. Still further alternatively, a first stored label need not be discarded and replaced with a new label under the above circumstances; rather, the new label may be saved in a separate data store and both the first stored label and the new label may be utilized in further processing.

Figure 5A:
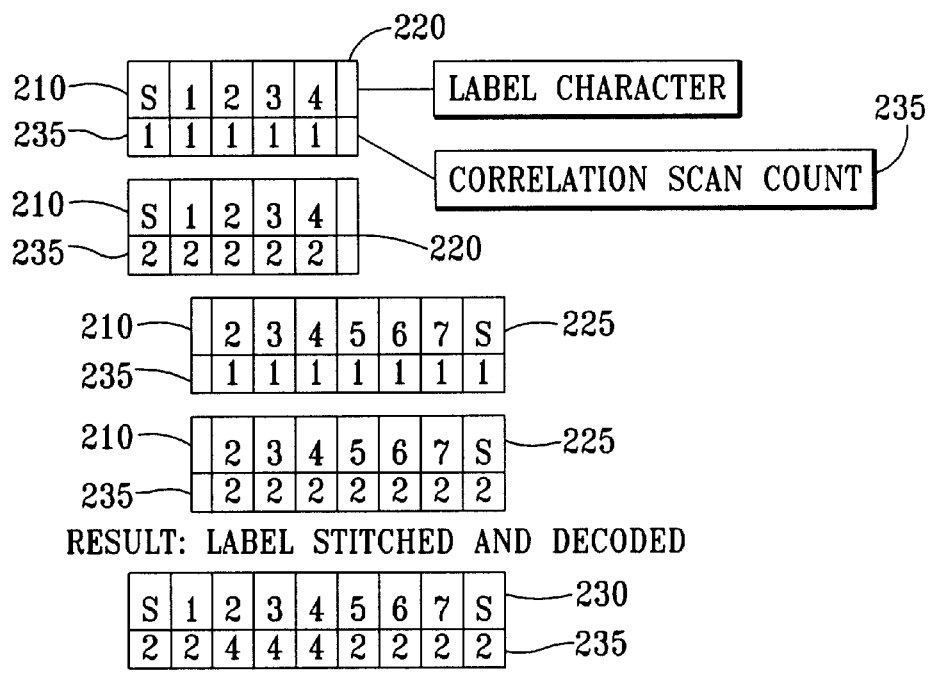
FIGS. 5A and 5B pictorially represent exemplary processing of scan lines using correlation and stitching techniques in accordance with the system and methodologies herein.
Figure 5B:
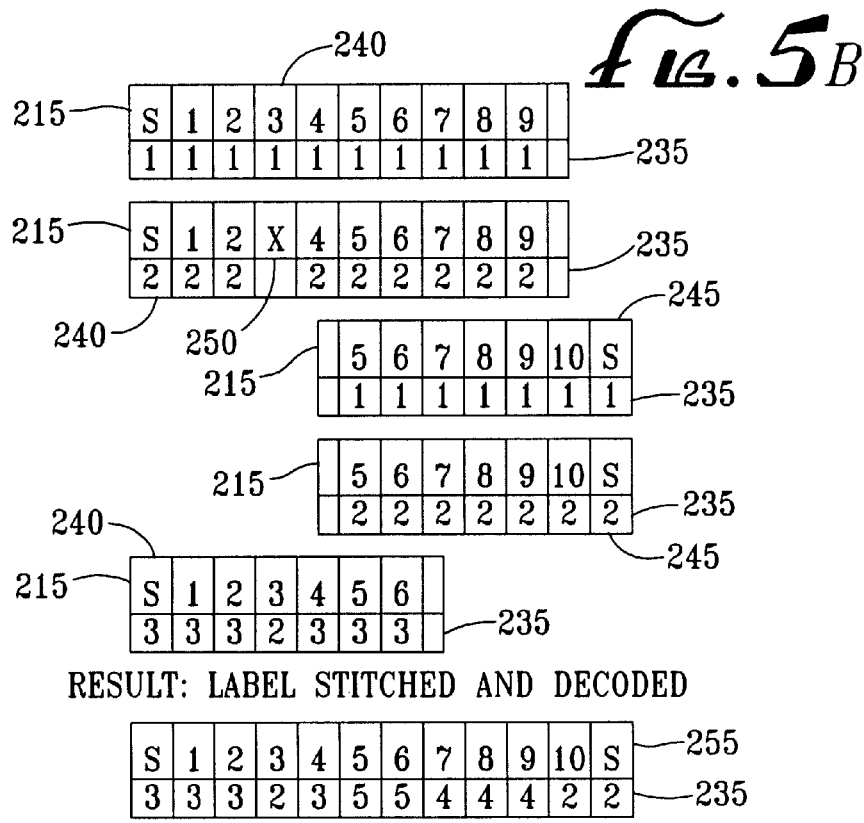

FIGS. 5A and 5B provide pictorial representations of exemplary sets of scan lines 210 and 215 that may be processed using correlation and stitching techniques in accordance with the system and methodologies herein. As may be seen in the first scan lines 210 of FIG. 5A, the four label scans comprise two left fragments 220 and two right fragments 225 are identified and the character values and positions in each are correlated (i.e., "lined up"). With respect to the first scan lines 210, it may be seen that no Undecodable Characters are identified. Accordingly, based upon the correlation, the label scans are stitched and a first resulting label 230 is decoded. It is noted that the correlation process includes maintaining correlation scan count information 235 for each scan line (as well as in relation to a resulting label) which indicates the number of times a particular character has been identified in a specific position.

Similarly, with respect to the second scan lines 215 of FIG. 5B, the five scan lines comprising three left fragments 240 and two right fragments 245 are identified and the character values and positions in each are correlated (i.e., "lined up"). It may be seen that one undecodable character 250 is associated with one of the second scan lines 215. Despite the missing character value associated with undecodable character 250, the system and methodologies are capable of correlating the characters and stitching together a second resulting label 255 to be decoded. As with the first scan lines 210, the correlation process includes maintaining correlation scan count information 235 for each scan line (as well as in relation to the second resulting label 255) which indicates the number of times a particular character has been identified in a specific position.

In further accordance with the system and methodologies herein, improved stitching of label fragments from poor quality labels is provided. For example, stitching of Fragments may proceed even if some characters are not decodable. As well, symbologies configured for variable length may be stitched. In one aspect, the system may be set such that the order of arrival of Fragments may be considered when stitching. In this latter regard, less stringent stitching requirements may be allowed for Fragments that are decoded from consecutive scans of a specific scan line pattern as compared to Fragments decoded from non-consecutive scans.

The system and methodologies herein provide for scans of a label to be decoded using correlation techniques as described above. The decode of a scan may result in a decode of a Full Length Label or only a Fragment. Where decoded Full Length Labels and Fragments have characters that were successfully decoded and characters that could not be decoded, i.e., Decoded Characters and Undecodable Characters, specific rules, as further described by example hereinbelow, may be utilized to merge such Full Length Labels and/or Fragments together. In this regard, one set of rules may be implemented to merge Full Length Labels and Fragments together, while another set of rules is implemented to stitch just Fragments together. Further, specific rules, as provided herein, are used on the final stitched label before the label is accepted. The flow chart of FIG. 6 illustrates the functional blocks of exemplary merge and stitching aspects of the systems and methodologies herein.

Figure 6:
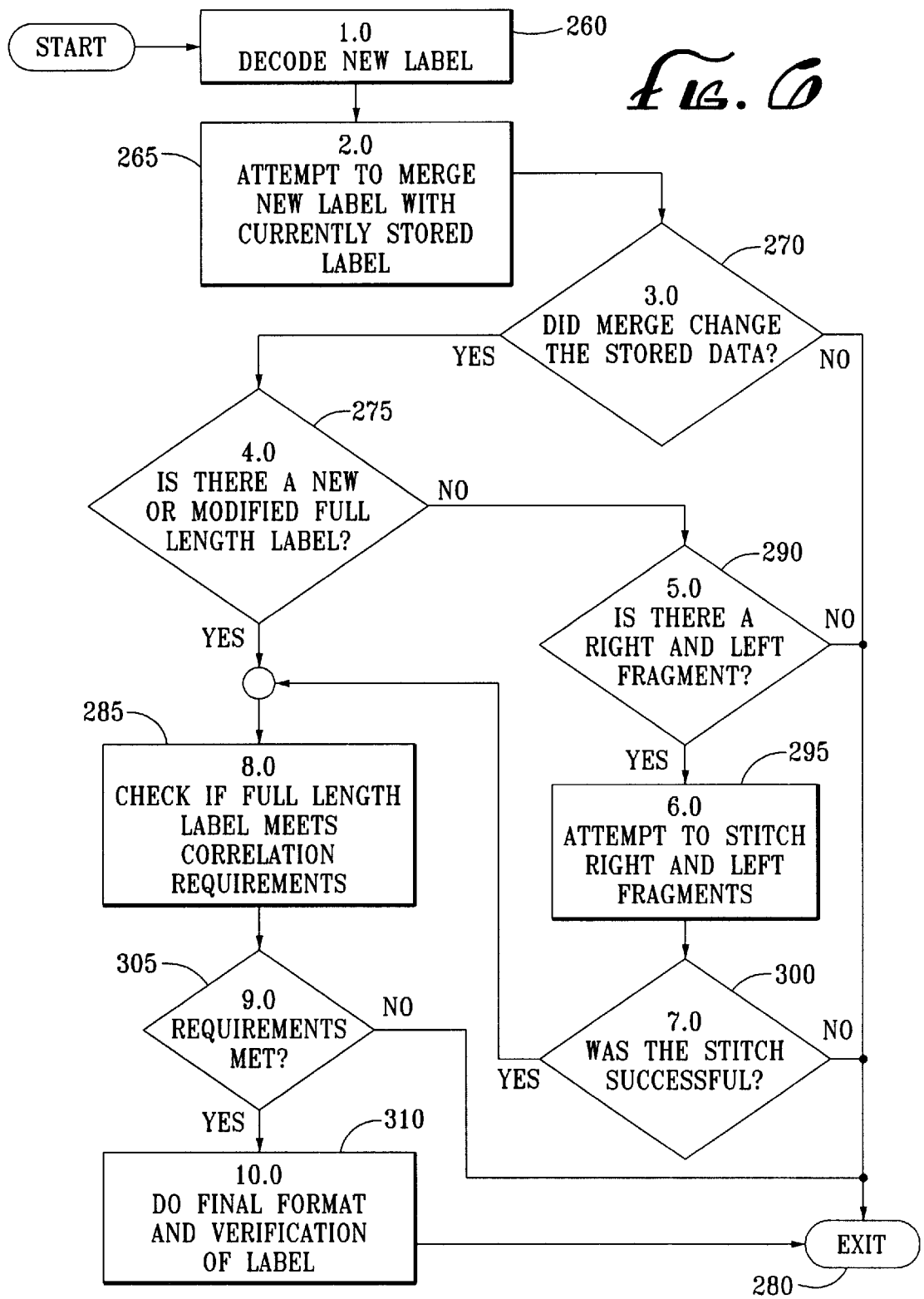
FIG. 6 is a flow chart diagram illustrating the functional blocks of exemplary merge and stitching aspects of the systems and methodologies herein.

With reference to FIG. 6, in a first step 260, the system decodes scans of a label, e.g., a new label. The decode of a scan may result in a Full Length Label or Fragment. Characters of the Full Length Label or Fragment may be Decoded Characters or Undecodable Characters. If the label is a Fragment, it is identified as a left or right fragment of the label.

In a second step 265, the system next attempts to merge a new label with a currently stored label if present. To this end, it may be determined if the two labels are to be merged in accordance with specific rules and logic (e.g., as provided herein). When a merge is acceptable, characters of the labels are merged using the previously detailed merge logic. Before an actual merge occurs, a merge check may be done (e.g., also in accordance with the rules set forth herein) to determine if a certain percentage (e.g., 75% in a preferred embodiment) of the Decoded Characters in the two labels match in value and position. If the percent matching criteria is not met, the merge check fails and the merge does not progress. Otherwise, the merge check passes and merge proceeds.

In a third step 270, the system determines whether the merge changed the stored data. If not, further merge/stitching processing is not required. If any of the merge actions resulted in a change to the stored data, the system continues with step four 275. If not, the routine proceeds to the exit step 280 and completes this processing.

In the fourth step 275, the system determines whether or not there is a new or modified Full Length Label. If so, further processing to determine if the new or modified Full Length Label meets requirements is performed (as will be further detailed hereinbelow in relation to step eight 285). If not, i.e., if it is Fragments that were modified, the system continues with step five 290.

In the fifth step 290, the system determines whether both left and right fragments are present. If not, further merge/stitching processing is not required as to the present labels and, thus, the routine proceeds to the exit step 280 and completes this processing. However, if both left and right fragments are present, the system then continues with step six 295.

In the sixth step 295, the system attempts to stitch the right and left fragments of the correlation store. Attempts to stitch both fixed length symbologies or variable length symbologies may be made.

In the seventh step, the system determines whether the stitch was successful. If stitching was not successful, then further merge/stitching processing is not required as to the present labels and, thus, the routine proceeds to the exit step 280 and completes this processing. If stitching was successfully performed, the system continues with step eight 285.

In the eighth step 285, the system checks whether or not the Full Length Label meets the system correlation requirements that have been established, e.g., whether each character of the label has been seen the specified number of times (e.g., as detailed in the rules set forth herein).

In the ninth step 305, the system stores the label for further correlation if it does not meet requirements. The routine then proceeds to the exit step 280 and completes this processing. If, however, the requirements are met, the system proceeds with step ten 310.

In the tenth step 310, the system does a final format and verification of the label. Final formatting of the label may include adding or removing characters in further stages of decoding. Verification of the label may include verifying a check digit or other configurable attributes of the label. Upon completion of this step, the routine then proceeds to the exit step 280 and completes this processing.

With respect to merging, the following rules are exemplary of those that may be utilized to merge labels in accordance with the system and methodologies herein.

When Full Length Labels are merged with other Full Length Labels, they must be the same length or the merge is not accepted.

Fragments can be merged with Fragments of different lengths or with a Full Length Label. The Merging Length is the length of the smallest Fragment.

If the length of a Fragment is greater than a Full Length Label, the two shall not be merged.

If the new label is a Full Length Label and Fragments are currently in the Correlation Store, an attempt to merge the Fragments with the Full Length Label is made before storing the result.

If the new label is a Fragment and a Full Length Label is currently stored, an attempt to merge the Fragment with the Full Length Label is made before storing the Fragment.

With respect to stitching, the following rules are exemplary of those that may be utilized when performing character correlation and stitching in a preferred embodiment:

When Fragments or Full Length Labels are merged together, at least 50% of the Decoded Characters must match or the oldest is discarded (alternatively, both old and new fragments may be separately saved for further processing). The shortest Fragment may be discarded in the case of merging two (2) Fragments together.

Full Length Labels have priority over Fragments.

Long Fragments have priority over short Fragments.

Fragments can be merged with a Full Length Label or other Fragments using character correlation.

Stitching of label Fragments in a symbology that is Variable Length shall require more Matching Decoded Characters in the Overlapping Region than a symbology that is Fixed Length.

Stitching of Fragments in a symbology that is Fixed Length or configured for Fixed Length shall require at least two (2) Matching Decoded Characters in the Overlapping Region.

Stitching of Fragments in a symbology that is configured for Variable Length shall require at least four (4) Matching Decoded Characters in the Overlapping Region.

A certain percentage of the Decoded Characters in the Overlapping Region shall be Matching Decoded Characters or the stitch is not accepted.

At least 80% of the Decoded Characters in the Overlapping Region of a stitched label shall match in character value and position.

For each Matching Decoded Character in the Overlapping Region, the sum of the scans from the right fragment and left fragment must meet a specified minimum value or the stitch is not accepted.

For each Matching Decoded Character in the Overlapping Region, the sum of the scans from the right fragment and left fragment must be at least four (4).

In symbologies with more than one, e.g., two (2), Fixed Lengths or Variable Length, the stitch of two Fragments will not be allowed if all of the Matching Decoded Characters in the Overlapping Region are the same character, i.e., have the same character value. Alternatively, the stitch of two fragments may not be allowed unless at least a specific number of different character values, e.g., three (3) are identified in the Overlapping Region.

When stitching Fragments of a variable length symbology, the overlapping length with the greatest number of Matching Decoded Characters in the Overlapping Region will be accepted.

Each character of a label has to be seen at least two (2) times before the label will be made available for final verification. This applies to all labels, stitched or not.

The stitching of label Fragments that are decoded in consecutive scans require fewer Matching Decoded Characters and fewer scans of the Matching Decoded Characters than the stitching of Fragments that are not decoded from consecutive scans. For example, a preferred embodiment requires no further scans when a left and right fragment are scanned consecutively and merged successfully; however, if left and right fragments are scanned non-consecutively, two scans would be required for each character in the left fragment and two scans would be required for each character in the right fragment.

When stitching Fragments, the positions with Non-Matching Decoded Characters will be merged by storing the character of the two Fragments with the most scans. If the number of scans are equivalent, the merge of the characters will result in storing an Undecodable Character Identifier in that position. The number of scans for the merged character will be the difference in the number of scans of the Non-Matching Decoded Characters of the two Fragments.

Element Reconstruction, Correlation and Stitching

Similarly to methodologies implemented with respect to character level processing, as detailed above, element level processing may further be utilized in accordance with the system and methodologies herein.

In one aspect, element correlation may be utilized when a complete label may otherwise be decoded except that it is missing one or more characters. If repeated scans of the same label cause the same characters to be missed, elements in the same area in the raw label data could be correlated across multiple scans (e.g., with some degree of repetition as in character correlation) in an attempt to create a decodable character. This could also be thought of as stitching on a single element basis with no overlap required. Alternatively, stitching may be implemented on an element level with pieces of a label being stitched together on an element basis with a certain amount of overlap being required before pieces are stitched together.

In another aspect of element correlation, elements across several scans may be correlated by correlating the entire scan at once. To line up two scans with each other, a set of random time values within the scan may be compared. The offset providing the best comparison result may then be utilized to correlate the two scans. To correlate the scans, the elements are normalized. With respect to binary symbologies, a preferred embodiment normalizes the scans into about 6 widths, e.g., too narrow, narrow, not narrow enough, not wide enough, wide, too wide. Similarly, with respect to multi-width symbologies the scans are normalized into about 24 widths. As with character correlation, specific rules may be devised and implemented for choosing which elements are correct between two scans.

Element correlation will merge normalized element width information from several scan lines to build a complete scan of the label. The element widths identified from the histogram will be used to normalize the element width data. Should element correlation fail to yield a decodable character, element reconstruction may be utilized. This latter technique makes use of multiple scans of data and a knowledge of the character set being decoded in an attempt to reconstruct the most likely character that is encoded in the undecodable data. Using the Element Width Histogram data to assess element equality, voids present in the middle of a bar and spots present in the middle of a space may be corrected. To this end, the average width of each width for the spaces and bars is determined using the histogram data. If a particular element in the label does not fit an average size, the system and methodologies herein provide for an attempt to combine that element with either the previous two elements or with the following two elements in a systematic manner. If either of the resulting combinations is an average size, the combination is saved as the correct element.

Quality Measure Techniques

Element Level Quality Measure Techniques

Typical standard algorithms for decoding bar codes rely on the elements as they are captured to be of relatively accurate width and position. Depending upon the symbology being decoded, the correct number of detected elements to make up a character are first normalized, and then the resulting pattern is-compared to a table of valid characters to determine the value of this encoded character. However, if the elements are distorted such that they are no longer detectable, or such that the element widths and positions as detected are not accurate, the typical standard decoding algorithm may no longer be capable of decoding the character or may decode it incorrectly.

In accordance with the preferred system and methods herein, measures of quality may be calculated and used in order to validate each detected element edge and to guide in the decoding of bar code characters. In cases where the elements have been distorted, disfigured or obliterated, and so might not be decodable by standard algorithms, such operation may be utilized to enable the elements to be reconstructed back to their intended widths and positions such that they could be correctly decoded. By using measures of the validity of the detected element edges, it may be possible to judge the validity of decoded characters, and to reconstruct distorted elements to their originally intended widths and positions, so that the character may be correctly decoded. In this manner, the ability of the bar code scanner to decode label data that may not be decodable using standard decoding algorithms may be improved.

One method of determining the quality of elements that may be implemented is to compare the elements as detected with target element widths that have been calculated as being appropriate for this particular label if it were of a particular enabled symbology. In this regard, it is envisioned that the target widths used for comparison may be generated by the histogram. Optionally, the decoder could generate these values by examining a number of elements in the data that is being decoded. In either case, the number of target widths would be equivalent to the number of valid element widths in the symbology being attempted. By way of example, with respect to a Code 39 symbology that has two valid widths, there would be two target widths. Similarly, since a typical UPC symbology has four valid element widths, there would be four target widths used for comparison.

A variety of possible means may be envisioned by one skilled in the art for determining allowable deviation of element widths for purposes of the above comparison. One possible means in accordance with a preferred embodiment herein is to calculate a tolerance value from the target widths. By way of example in relation to a Code 39 symbology, one half of the difference between the wide target width and the narrow target width could be utilized as a valid threshold to determine acceptable deviation.

Another method of determining element quality that may be implemented is to use a confidence rating for the edges of the elements and to compare this value with some calculation of such value for the rest of the character or label being decoded. In this latter regard, a value indicating the strength of the edges as previously described may, for example, be utilized. As above, it is envisioned that the target edge strength that is used for such comparison may be generated by the histogram. Again, optionally, the decoder could generate this value by examining the edge strength of a number of elements in the data that is being decoded. As with the element width comparison above, a variety of possible means may be envisioned by one skilled in the art for determining allowable deviation of element edge strengths for purposes of the above comparison.

In cases where single elements have been split into multiple components through the inclusion of spots, voids or other defects, a combination of the above two methods may be envisioned for use in determining the correct bounds of the element, allowing the invalid detected elements to be ignored. In cases where elements have been rendered undetectable through obliteration by spots, voids or other defects, a combination of these methods might be used to insert an element of the desired width at the appropriate location into a character, based upon the locations and calculated validity of the other, detected elements.

To further assist in the above process, and/or as a check, resulting patterns may be compared with a table of possible valid characters as element widths are being reconstructed. This would provide an additional validation that the elements were being reconstructed back into their most likely original form. As well, such comparison may be utilized to identify characters that are, in fact, not decodable earlier in the process so that no further effort would be spent attempting to decode such character.

It is noted that some instances of this reconstruction process may result in two or more possible interpretations of the same element set, creating an ambiguous decode. In such cases, a preferred embodiment may resolve such ambiguity through a comparison of the sums of the quality measures of the elements as they have been defined to compose the different potential characters. In this regard, the character having the highest determined quality by a pre-established margin may, for example, be selected as the correctly decoded character.

In accordance with a preferred embodiment, one possible means of generating a measure of quality of an individual element is to calculate the product of the deviation of the element width from target and the deviation of the element edge strength from target. The sum of these products for all of the elements in a character would generate a measure of quality for the character. It is noted, however, that other means of generating a measure of quality of individual elements based upon the above comparisons may be devised and implemented by one skilled in the art without departing from the spirit and scope of the inventive concepts set forth herein and in the appended claims.

Figure 7A:
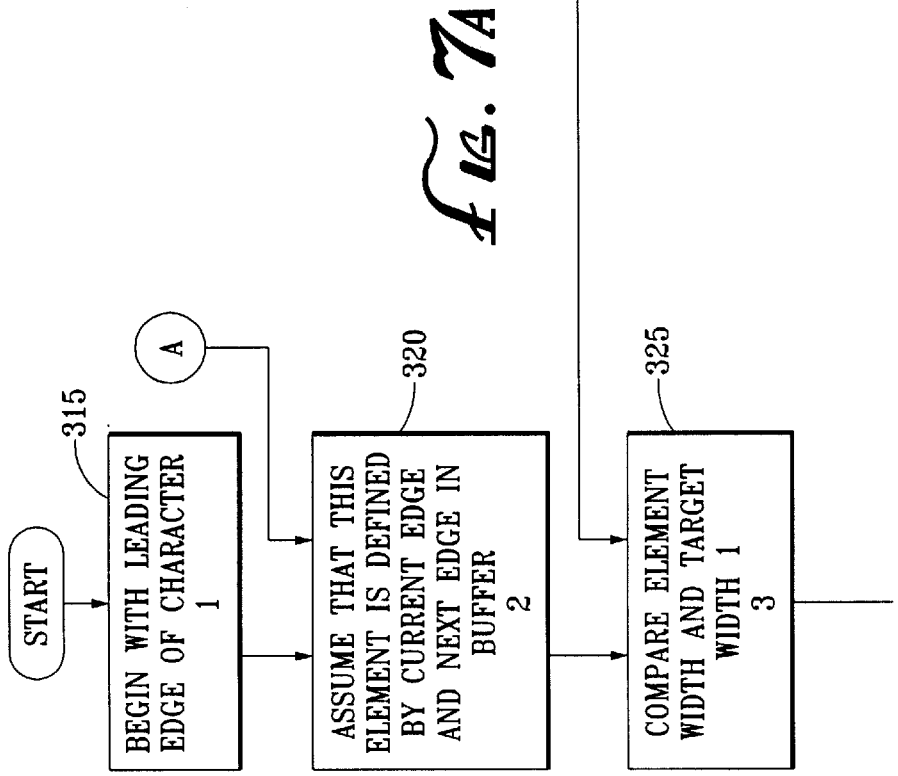
Figure 7B:
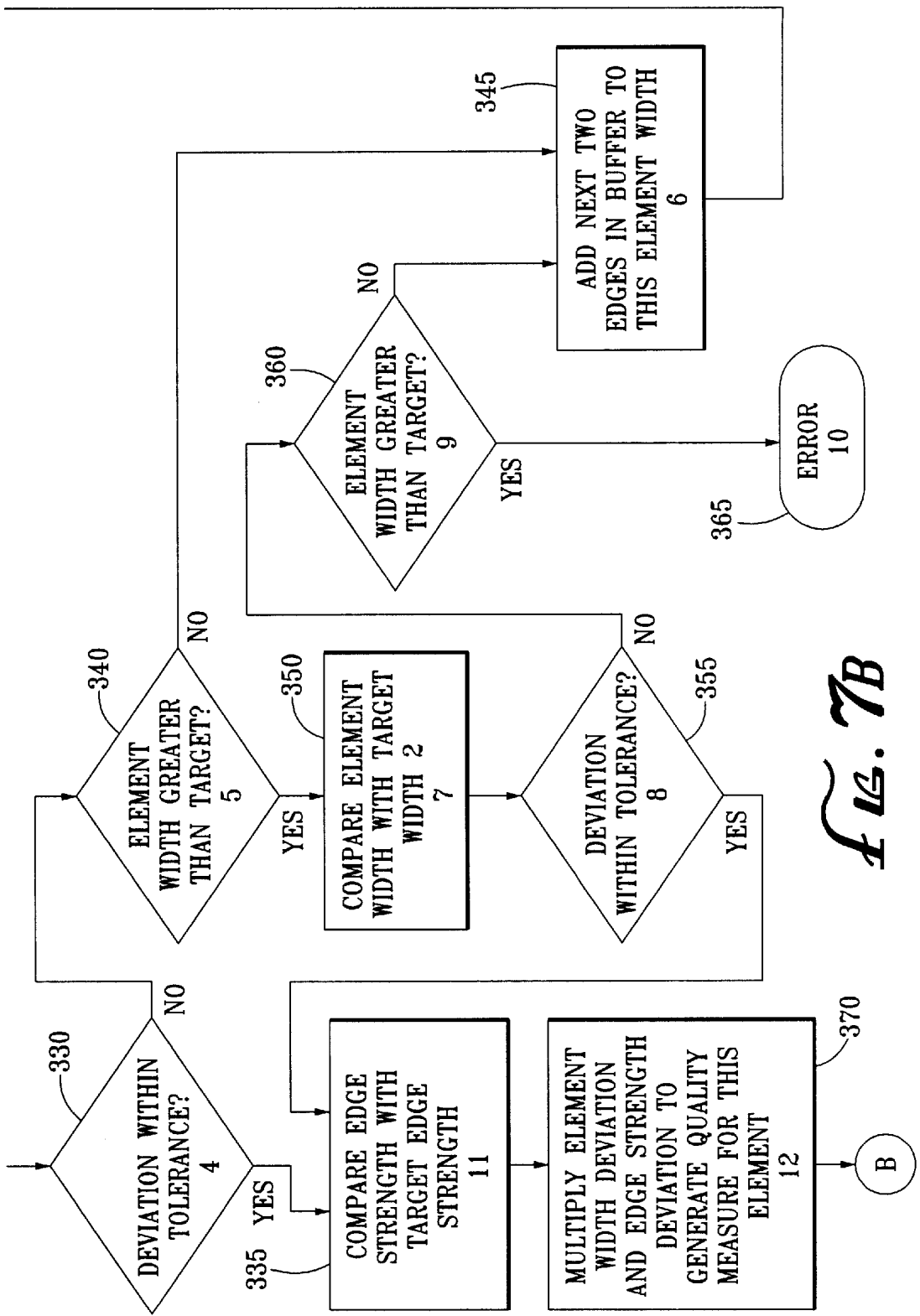

With reference to FIG. 7, element level processing with quality measure calculation begins with a leading edge of a character in the first step 315. In a second step 320 it is assumed that the current edge and the next edge in the element edge buffers define an element. In a third step 325, the element width defined by the assumed current edge and next edge in the element edge buffers is compared with a first target width. In a fourth step 330, a determination is made regarding whether the deviation in the compared values from the third step 325 is within the pre-established tolerance. If so, processing continues with the eleventh step 335 (as further detailed below).

If a determination is made in the fourth step 330 that the deviation is not within tolerance, a further determination is made in the fifth step 340 regarding whether such element width is greater than the target element width. If not, processing proceeds with the sixth step 345 wherein a new element width is calculated by adding the appropriate value associated with the next two edges in the element edge buffers to the old element width. Processing then continues from the third step 325, as previously detailed, with the new element width value. If it is determined in the fifth step 340 that the element width is greater than the target width, processing continues with the seventh step 350 wherein the element width is compared with a second target width. In the eighth step 355, a determination is made regarding whether the deviation in the compared values from the seventh step 350 is within the pre-established tolerance. If so, processing continues with the eleventh step 335 (as further detailed below).

If a determination is made in the eighth step 355 that the deviation is not within the tolerance, a further determination is made in the ninth step 360 regarding whether such element width is greater than the target element width. If not, processing proceeds with the sixth step 345 wherein a new element width is calculated by adding the appropriate value associated with the next two edges in the element edge buffers to the old element width. Processing then continues from the third step 325, as previously detailed, with the new element width value. If it is determined in the ninth step 360 that the element width is greater than the target width an error is recorded in the tenth step 365 and processing ends.

If, as a result of the fourth step 330 or the eighth step 355, it is determined that the corresponding deviation is within the corresponding pre-established tolerance, processing proceeds with the eleventh step 335 wherein the corresponding edge strength value is compared with the target edge strength. Processing then continues with the twelfth step 370 wherein the element width deviation and the edge strength deviation values are multiplied to generate a quality measure for this element. Further processing continues as detailed below in conjunction with FIG. 8.

Figure 8:
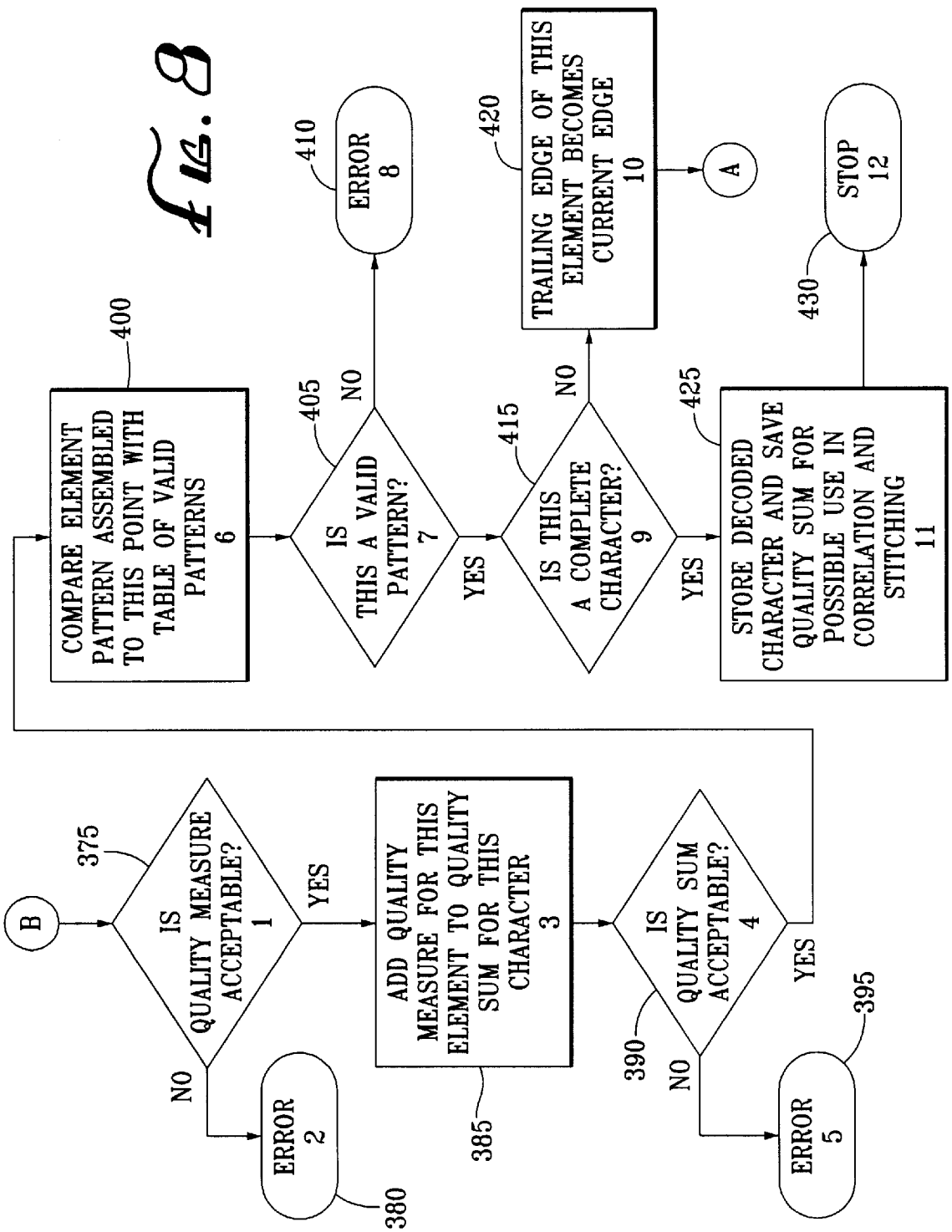
FIG. 8 is a flow chart diagram illustrating a second portion of the functional blocks of an exemplary element level processing with quality measuring routine in accordance with the system and methodologies herein.

With reference to FIG. 8, a determination is made in a first step 375 regarding whether or not the quality measure generated (in the twelfth step 370 with reference to FIG. 7B) is acceptable. If not, an error is recorded in a second step 380 and processing ends. If the quality measure is determined to be acceptable in the first step 375, the quality measure for the current element is added to the quality sum for the current character in the third step 385. Processing then continues in the fourth step 390 wherein a determination is made regarding whether or not the quality sum resulting from the third step 385 is acceptable. If not, an error is recorded in a fifth step 395 and processing ends.

If the quality sum is determined to be acceptable in the fourth step 390, processing continues in the sixth step 400 wherein the element pattern assembled to that point is compared with a table of valid patterns. In the seventh step 405, a determination is made regarding whether or not the currently assembled element pattern is a valid pattern. If not, an error is recorded in the eighth step 410 and processing ends.

If the currently assembled element pattern is determined to be a valid pattern in the seventh step 405, a further determination is made in the ninth step 415 regarding whether or not the currently assembled element pattern comprises a complete character. If not, the trailing edge value of the current element becomes the current edge value in the tenth step 420 for further processing from the second step 320 of FIG. 7A.

If it is determined in the ninth step 415 that the currently assembled element pattern comprises a complete character, processing continues with the eleventh step 425 wherein the decoded character is stored and the quality sum is saved for possible use in correlation and stitching routines. Processing is then completed in the twelfth step 430.

Character Level Quality Measure Techniques

As indicated previously, when attempting to decode poor quality bar code labels, character correlation and stitching algorithms may be used in an effort to assemble a complete label from individual characters decoded over multiple scans. In one manner of implementation, as detailed above, character correlation and stitching algorithms may operate by requiring that any given character in a label be decoded as the same character a preset number of times before being accepted as a valid character for that position. Because of the nature of poor quality labels, however, all of the individual characters may still not be correctly decoded. Such remaining invalid characters can potentially corrupt the accumulated data such that the correct label is never completely assembled.

In accordance with a preferred embodiment herein, a confidence measure for each decoded character may further be used to assist in correlation and stitching. The measure of confidence of each character as it is decoded may be used to determine the number of times that a particular character must be decoded before being accepted. In a preferred implementation, a decoded character that is determined to be of poor quality may be required to be decoded as that same character a greater number of times than if it were of good quality.

In a preferred approach, an inverse relationship between the quality of a character and the number of times that it would have to be decoded before being accepted may be established and utilized. The following example illustrates a manner in which this approach may be implemented. Assuming a first scan of a label yields a character decoded as a first value in a particular position and with a quality rating of 100. On a second scan of the same label, the character in the same position is decoded as a second value with a quality rating of 300. In accordance with this example, lower quality rating numbers indicate higher confidence. Thus, the quality rating of 300 represents only one-third the confidence of character decoded with a quality rating of 100. In such instance, the character having the quality rating of 300 may, for example, be required to be decoded three consecutive times before it would be allowed to replace the character having a quality rating of 100 that was decoded once in the correlation function.

By using a measure of the quality of each decoded character, the correlation and stitching algorithms may be able to prevent the invalid characters from being accepted as valid, and therefore enable the correct label to eventually be completely assembled. In this manner, the effectiveness of character correlation and stitching algorithms may be improved. Such algorithms may then be used in a bar code scanner to decode label data not decodable using standard algorithms.

Threshold Adjusting Techniques

In another aspect of the system and methodologies herein, a limitation on acceptable element widths may be implemented when using character correlation to scan poor quality labels. As indicated previously, thresholds are used to determine which normalized element width represents the actual element width when normalizing the elements of a label. The thresholds allow a range of element widths to be accepted for each normalized width. When poor quality labels are scanned and require the use of character correlation and stitching, however, the risk of incorrect decoding is increased. To offset this increased risk, the system and methodologies herein provide for the threshold ranges to be changed when character correlation and stitching are used. That is, when the scanner starts using character correlation and stitching, the acceptable range of element widths for each normalized element may be reduced from the initial range. By reducing the acceptable range of element widths, fewer characters may be decoded incorrectly; thus, giving decoded data that is more accurate and consistent. With more accurate decoded data, character correlation and stitching converges on the correct label data more quickly. In this manner, the performance of character correlation and stitching when poor quality labels are scanned may be improved.

One method that may be envisioned to adjust the threshold values in relation to character correlation and stitching would be to maintain a record, for each symbology decoded, of the degree of congruence of elements in labels that did not require correlation or stitching. Such record would then provide example values in relation to good quality labels. When correlation or stitching was subsequently required in relation to further labels, the threshold levels could be adjusted such that only elements with equivalent or better degrees of congruence to those in the good quality examples would be accepted.

In another aspect, variable thresholding may be implemented. This technique would mainly apply to binary codes and would be used to allow the wide to narrow ratio to be adjusted to be more or less stringent vs. aggressive. This technique may advantageously further result in an increase of the depth of field in which binary codes may be read.

Further, the instant system and methodologies provide for staged decoding through levels of decoding intelligence. In this regard, the scanner may be programmed such that its level of decoding intelligence is increased as it reads more scans. As the scanner goes to more intelligent decoding modes, it may use a more complicated decoding threshold scheme. For example, the system may start with a simple scheme (to decode good quality labels that are susceptible to normal decoding fast) and then advance to a more complicated threshold scheme for aggressive decoding to reduce misreads and allow for better definition of the problems in the label.

In a scanner that has programmable thresholds for decoding, setting the thresholds at the most stringent levels will generally result in the fewest misreads. However, this may prevent reading of labels of poorer quality. As a result, the user may try to program the scanner with inappropriate threshold levels in an effort to scan all of their labels. In a still further aspect, the system and methodologies herein provide for automatic programming of decoding thresholds to enable the user to easily adjust decoding aggressiveness to match label quality. This technique allows the user to set thresholds by scanning labels of typical quality. For example, when the scanner has been placed into a special programming mode, the user may then scan labels that exhibit characteristics typical of the labels that they will be scanning. Decoding routines could then be adjusted to utilize the appropriate thresholds to allow the labels to be decoded. Thus, thresholds could be adjusted to the optimum levels for decoding the user's labels. These thresholds would be saved and used for all future decoding of labels of this same symbology until further programming is performed.

Signal Processing Modification Based on Decoder Feedback

When scanning label data, the accuracy of the bar/space edges detected and passed on to the decoding software is dependent upon a number of factors. Among the factors are parameters in the signal processing system such as gain and threshold. Typically, the signal processing system in a bar code scanner is designed around parameters that are fixed or, if variable, may be modified based upon feedback within the signal processing system itself. Thus, for example, gain and threshold parameters, if not fixed, may be adaptively adjusted based upon feedback from prior processing of the input signal by the signal processing system. It has not heretofore been devised to incorporate feedback from outside of the signal processing system in order to adaptively adjust signal-processing parameters for further processing.

In a further aspect of the preferred system and methods herein, aspects of the signal processing system may further be enabled to be modified based upon feedback from the decoding software. Signal processing parameters such as gain and threshold may be adjusted based upon information obtained in the process of decoding label information. Should decoding of information from the signal processor (for example, utilizing further techniques identified herein) indicate that an adjustment to the gain, threshold, or other parameters in the signal processing system could provide for more efficient decoding of subsequent label information, then appropriate adjustment to such parameters may be made accordingly. By allowing parameters to vary based upon feedback from the decoders, it may be possible to more accurately tune the signal processing system to match the specific circumstances of the label being scanned, thus leading to more accurate data being collected, and to the generation of a more accurate representation of the label data being scanned. In turn, the probability of correctly decoding the label in a short time is increased.

Scan Line/Mechanism Compensation

When capturing bar code data using a dithering scan mechanism, the bar/space element times will increase at the ends of the scan line because the scan mechanism must slow down to reverse direction. As the dithering mechanism slows down to reverse direction, the corresponding distortion of the collected scan data can cause it to be unusable for decoding. This effectively shortens the usable scan line. Current practices either discard the data from the ends of the scan line as being too distorted, or attempt to correct it on a character by character basis as it is decoded. However, the distortion of the data at the ends of the scan line can potentially be more severe than can typically be corrected on a character by character basis.

To counter the effects of the scan mechanism operation at the end of scan lines, and to further ensure that accurate information is presented for decoding, the system and methodologies herein provide for the adjustment of certain collected scan data by a predefined offset to compensate for known variations in the scan mechanism speed. Because the physical properties of the scanning mechanism are well understood by those skilled in the art, the variations in speed which it will exhibit over the course of the mechanism's scanning arc can be accurately predicted. Accordingly, a table of compensation values can be generated that can be applied to the collected data. Because the location in the scanning arc where each data value was collected is known, the appropriate value from the compensation table can be applied to each item of data.

For example, the speed of the scanning spot can be characterized over the course of the scan line. With knowledge of the rate of change of the scan mechanism speed at the ends of the scan line, and position information in relation to such change in speed over the scan line, a measure of the associated time distortion with respect to elements encoded in the scan line information may be established. In turn, the compensation curve may be determined to identify the offset that may be applied to the collected data to adjust it for the variation in speed. By compensating for such distortion, the entire scan line of data may be used; thus more efficiently obtaining complete character information that might otherwise have required additional scans—and time—to obtain and decode. In this manner, the effect that the variations in scanning speed may have had upon the value of the data may be effectively nullified.

Rounded Surface Interpolation. When scanning a label attached to a rounded surface (e.g., on a can or bottle), a certain amount of distortion is encountered due to the varying distances of the scan line to the label as it moves across the label. In this aspect, the system and methodologies herein provide interpolation techniques that may be implemented as a means of compensation for the distortion of elements. Similarly to scan line compensation techniques discussed above, potential offset amounts could be determined and implemented to adjust for character/element width distortion. It may be envisioned that such offsets could be used either directly on identified character/element widths, or they may be implemented as part of a secondary, more aggressive technique to fit elements/characters into a known pattern during reconstruction.

Additional Decoding Techniques

To further ensure that scan information is properly decoded, a scanner in accordance with the system and methodologies herein may employ one or more of the following techniques.

Decode Initiation. In this aspect, the scanner would keep track of the number of elements in potential labels and the total time (i.e., label element total count) associated with potential labels. In this regard, the first stage of the decoding/reconstruction sequence would not be initiated until the number of elements and the time count stabilized.

Margins. Existing scanners typically require that some amount of margin space be detected in conjunction with a label scan. In accordance with this aspect of the system and methodologies herein, margin checking requirements could be modified as the decoding intelligence level changes. For example, if the histogram shows a label with well defined element widths, a margin requirement may be skipped with respect to that label. This feature could further be implemented in conjunction with the aggressiveness level changes, as further detailed hereinbelow, to change the margin requirements automatically as different levels of decoding are implemented.

Quiet Zones. As above, existing scanners will typically find leading quiet zones during data capture. In this aspect of the system and methodologies, the scanner would also find possible trailing quiet zones in order to aid in a determination of where potential label data exists in the capture buffer.

Typically, quiet zones are defined as being an element which is some integer multiple, commonly six to ten, times the width of a narrow element in the label. These quiet zones are expected to be found on either end of the label and serve to delineate the label from the label's surroundings. However in some cases, particularly when the label has been printed on a textured surface, spurious transitions may occur at the ends of the label in the area of the quiet zones. Such spurious transitions may appear as elements to the scanner where, in fact, there are none. Normally, the presence of elements in what should be the quiet zone would invalidate that area as a quiet zone. If a detection of a quiet zone were required for decoding a particular symbology, or by a particular decoding algorithm, the erroneous invalidation of the quiet zone could prevent the successful completion of the decode.

In accordance with a further aspect of the preferred systems and methods herein, edge strength information may be used to detect the existence of a valid quiet zone even though it may appear that it contains elements. In this regard, if a quiet zone is being tested for, and it appears to contain elements, the edge strength of those elements could be compared with the average edge strength of the elements in the label. If the edge strength, i.e. confidence level, of the elements in the potential quiet zone were below some threshold (which may, for example, be 25 percent less than the confidence level of the elements in the label), then other factors, such as the presence of an adjacent STOP or START pattern, could be considered to determine if this was a valid quiet zone. This could allow the successful completion of a decode even though phantom elements may appear in the data in the location of the quiet zone.

Bi-directional Decoding. Existing scanners typically decode in only one direction. Thus, when scanning a poorly printed label, the scanner is only able to "look at" the label from one side on each scan. Further, when scanning a label fragment, the scanner is only be able to decode the fragment every other scan line. In this aspect of the system and methodologies herein, decoders and margin searching features are enhanced so that the decoders can decode the scan line in both directions. In this manner, additional scan information may be decoded, e.g., through reconstruction techniques that might otherwise have been lost as a result of the inopportune location of label defects.

Decoding Credits. In this aspect of the system and methodologies herein, it is envisioned that each decoding session of a label would be allowed a certain number of decoding credits. Such decoding credits would be assignable to the various decoding techniques that may be implemented in the established configuration for a particular scanner. Decoding methods of high risk would use more credits than methods of low risk. Since the use of more aggressive, i.e., higher risk, decoding techniques may result in an increase of potential misreads, use of a decoding credit scheme could serve as a check on decoding security.

By way of example, a decoding session could start out with each symbology having a budget of 100 credits. A particular number of credits would be associated with each of the variety of decoding function/technique available for implementation, respectively. For example, ten (10) credits may be associated with reconstruction of a character, twenty (20) credits with the lack of a trailing quiet zone, five (5) credits per character may be associated with correlation, and so on. As each decoding function is invoked, the appropriate number of credits associated with that function is subtracted from the total available. If the total drops to zero or below as a result of such subtraction, decoding for that symbology is stopped.

This scheme would allow the decoder to attempt a certain number of high risk decoding techniques while maintaining a desired overall security level. Thus, by way of one example, even where a high level of decoding security is desired, decoding credits could be implemented such that where all of the data characters of a label decode easily, the scanner could allow the guard patterns to be of lower quality requiring more aggressive decoding techniques.

Use Of Analog Information. The systems and methodologies in accordance with the preferred embodiment herein may further make use of analog data, such as the amplitude of RTV/STV signals from the scan head. Such amplitude information may be stored as the bar and space data is stored. This amplitude information would then give the decoders information about the strength of space-to-bar and bar-to-space transitions that may be used to distinguish phantom transitions from real transitions. In addition, the strength of the signal could be used as an aid in a determination of how to adjust for inter-symbol-interference when the bar and spaces are very narrow or the label is at a far distance. Further aspects of how the system and methodologies herein may advantageously utilize analog information are detailed immediately hereinbelow.

Decoding Aggressiveness Configurations Staged Decoding

In accordance with the system and methodologies herein, two stage use of analog and digital label data (i.e., a digital-to-analog switch) may further be implemented as a means of systematically varying the aggressiveness of decoding.

Existing systems have typically approached the decoding of labels in one of two ways:

One approach has been to process only the digital label information so that good quality labels were decoded quickly. With respect to digital decoding, the hardware of a laser based scanner may be constructed to generate one or more digital signals from the reflected laser signal. One possible implementation of a digital signal indicates a bar of the label by maintaining a specified voltage level for the time that the laser is positioned on the bar and it indicates a space of the label by maintaining a different specified voltage level for the time that the laser is positioned on the space. Another possible implementation of the digital signal indicates a space-to-bar transition of the label by generating a digital pulse when the laser moves from a space to a bar. In this second implementation, a second digital signal indicates a bar-to-space transition of the label by generating a different digital pulse when the laser moves from a bar to a space. In both types of implementations, the digital signal(s) are used to determine the width of bars and spaces using time measurements. The time measurements of bars and spaces are then used to decode the bar code. The digital signal provides a simplified version of the reflected laser signal. The simplified signal is quick to store and quick to decode by the scanner's microprocessor. Since the signal is quickly processed, the decoding is very fast. However, if the label is of poor quality, the digital signal alone may be insufficient to allow the label to be decoded.

Another approach has been to spend the processing time to record and process both analog and digital label information so that labels of all levels of quality could be decoded. With respect to analog decoding, the hardware of a laser based scanner may also be constructed to generate one or more analog signals from the reflected laser signal. One possible implementation of an analog signal produces the signal strength of the reflected laser signal. This signal can be digitally sampled and used by the microprocessor based decoder. A second possible implementation of an analog signal produces the first derivative of the signal strength of the reflected laser signal. This signal can be digitally sampled and used by the microprocessor based decoder. Analog signals from the reflected laser signal provide more information than a digital signal. In addition to the information that a digital signal can provide, the analog signal can indicate the amount of contrast between the bars and spaces and the sharpness of the edge between bars and spaces.

The digital only approach limits the scanner in its ability to read poor quality labels. The additional information provided by analog decoding may be used to help read high density labels, to correct for problems due to low contrast, or to correct for problems due to spots and voids. However, while analog information may be useful when trying to read low quality labels, sampling, storing, and processing the analog information is time consuming; thus, decoding labels with exclusive use of analog information can lead to long decoding times for labels even if they are good quality. Thus, the analog and digital approach results in the decoding time for good quality bar codes to be long.

The instant system and methodologies improve on these limitations so that good quality labels are decoded quickly while poor quality labels may still be decoded. In the preferred embodiment, the system first attempts, e.g., with respect to a first set of scan lines, to store and use only digital label information. If a valid label has not been found during this first set of scan lines, the system then starts storing and processing analog information to help find the label in the scan line data. Thus, the preferred embodiment is capable of using both the analog and digital representation of the bars and spaces of a label that may be produced by the electronics of the scanner, but does so in a systematic, staged manner so as to improve decoding time. In the first stage of decoding, the decoder will use the digital information to attempt the decoding of a label. In the second stage of decoding, only if necessary, the decoder will use the digital and analog information to attempt the decoding of a bar code.

Levels of Reconstructive Logic Decoding

In addition to the staged digital/analog decoding as detailed above, the instant system and methodologies provide further techniques for systematically adjusting the aggressiveness of decoding. There are many techniques to aggressively decode poorly printed labels. Each technique has a certain amount of misread risk. In general, the techniques that allow the scanner to read more poorly printed labels have a higher risk of misread. The levels of aggressiveness could be established so that the techniques that allow the most poorly printed labels to be read have the highest aggressiveness level. Some possible techniques that could be assigned aggressiveness levels are:

Character based stitching—Combining several pieces of a label to make a resulting complete label. The pieces can be combined when a certain number of characters are common between the pieces.

Element based stitching—Combining several pieces of a label to make a resulting complete label. The pieces can be combined when a certain number of bars and spaces are common between the pieces.

Element addition—Bars and spaces that are much smaller than most bars and spaces of the label can be combined with other bars and spaces.

Character correlation—Using multiple full scans of a label to find all characters of a label. Some characters may not be decoded in one scan while other characters may not be decoded in a second scan.

Accordingly, the reconstruction techniques set forth herein, while more aggressively attempting to decode label information, may also increase the element of risk for misreads. In a preferred embodiment herein various levels of decoding may be accommodated and systematically implemented as further detailed hereinbelow. Each increased level of decoding generally corresponds to an increased level of aggressiveness and decreased level of security.

Exemplary of the levels of logic decoding that may be accommodated in accordance with the system and methodologies herein are:

Level 1: This level results in the quickest and most secure decoding on good quality data. In this level, a full scan of the label is required and all of the characters must be decodable by standard decoding techniques, i.e., no correlation, stitching or reconstruction is performed.

Level 2: This level may be utilized when different scans of the label yield different characters as being decodable, but no single scan yields all of the characters. Security is still good as each character must be seen multiple times in the same location to be accepted. Unless otherwise guarded against (such as through limitations on attempt time allowed), one downside of the stitching techniques that may be implemented at this level is that the decoder may spend extra time working on the wrong symbology. Traditional methods of stitching may be implemented at this level for use, e.g., with respect to situations where scanning is done from a distance wherein it is more difficult to line up the scan line with the label. Accordingly, multiple pieces of labels are assembled together with overlapping of characters. Thus, where a user merely swept the scan line through the label instead of lining the scan line across the entire label, complete label information may nonetheless be reconstructed. Fixed Length Label stitching may be utilized, i.e., partial scans which begin or end with a START or STOP pattern may be accepted and are assembled into a complete label. In such manner, label pieces from multiple scans of poorly printed labels may also be used to compensate for voids in the label data. Character correlation may also be utilized, i.e., fill scans of data which are missing characters may be accepted and are correlated across multiple scans to produce a complete label.

Level 3: This level may be utilized when Undecodable Characters are identified in one or more scans of a label. Character reconstruction is enabled at this level, as well as Variable Length stitching. While more aggressive, this level is also less secure because the reconstruction is done by passing the corrupted data through a set of rules to determine the correct character; thus, there is always the chance that the decoder will make the wrong decision. Stitching of Variable Length labels can also lead to misreads when there are large repeating patterns within the label. Enabling this level also consumes more time, which could delay the correct decoder for this symbology from being invoked. Character reconstruction may be utilized in this level, i.e., when a character is distorted such that no scan yields a decodable set of elements for that character. This can occur when an element has been corrupted over the entire height of the label. This function will attempt to reconstruct the character from the corrupted elements using knowledge of the character set for the symbology. Variable Length label stitching may also be utilized at this level, i.e., partial scans of a Variable Length symbology which begin or end with a START or STOP pattern may be accepted and are assembled into a complete label.

Level 4: This level may also be utilized when one or more characters cannot be decoded due to the corruption of elements. There is a greater potential for misreads using the techniques at this level because of the insecurity of the initial data. Element correlation may be utilized at this level, i.e., when the label is so poorly printed that large numbers of the elements are missing on any given scan. This function will attempt to correlate the elements from several scans together to create one scan that can then be decoded.

The instant system and methodologies envision that the levels of reconstruction aggressiveness may be implemented such that the user could configure the degree of aggressiveness desired. For example, the user could configure the minimum and maximum aggressiveness on a per symbology basis. Allowing the minimum aggressiveness to start at a higher level (i.e., higher than level 1) could give the scanner a head start on aggressive scanning when the quality of the labels to be scanned is known to be poor. Allowing the maximum aggressiveness level to be set allows the user to limit the risk of misreads. It is further envisioned that a variety of techniques may be utilized to provide for variable aggressiveness configuration. For example, separate configurable decoding intelligence levels could be implemented at the label level and the character level. A further option would be to provide a bitmap of reconstruction options that could then be investigated and appropriately set for each level utilizing pre-established criteria. Still further, a specific set of reconstruction options could be developed to address specific problems (e.g., problems that have previously been encountered with respect to a particular symbology, or problems that are known to be likely to occur).

In another aspect of the system and methodologies herein, a technique of advancing decoding aggressiveness through time may be utilized. In a manner similar to that discussed above with respect to staged digital/analog decoding, the instant system and methodologies may use a multi-level approach for decoding aggressiveness that advances through the levels as the scanner processes scan lines. Existing scanners typically use only one level of decoding aggressiveness during the entire time that a label is decoded. The advantage of the instant system and methodologies is that well printed labels may be decoded quickly, and with low risk, while poorly printed labels may still be decoded as well. This allows for fast decoding times for good quality labels with decoding times increasing as the quality of the label decreases. This is important for scanners that cannot keep up with the label data input when using the most aggressive decoding techniques. It also allows the scanner to use the decoding techniques with lower risk of misread first and use the higher risk techniques only when necessary.

In accordance with the instant system and methodologies, the scanner is set up to have several levels of decoding aggressiveness, such as have been previously detailed hereinabove. The scanner starts with the initial level and advances through each level at certain time increments. In one envisioned application, the time could be measured by counting the number of scans of data collected. For example, after six scans of data have been collected without a successful decode, the level of aggressiveness could be incremented. Each level of decoding allows the scanner to decode labels of lower quality.

The above represents one possible implementation of aggressiveness level configuration. However, it is envisioned that progression through levels and decoding techniques at each level could be implemented differently.

In another aspect of a preferred embodiment, each symbology may have a level of aggressiveness option which can be set by the user to dictate how hard the scanner should try to make a label of that symbology out of any data that is scanned. As each level is enabled, the lower numbered levels may also be enabled, i.e. enabling Level 3 implies that Level 2 will also be enabled. In one implementation, the scanner would always start each scanning session decoding at level 1 and then would increase the level, as allowed, as each level of decoding fails to successfully decode the data. Such structure is intended to allow for fast decode times on good data, with decode times increasing as the quality of the data decreases. In effect, if the scanner is enabled to do so, as the quality of the data deteriorates, the scanner will work harder to decode it. FIGS. 7 through 10 combine to illustrate the functional blocks of an exemplary increased aggressiveness level decoding through time process which may be implemented in accordance with the system and methodologies herein.

Figure 9:
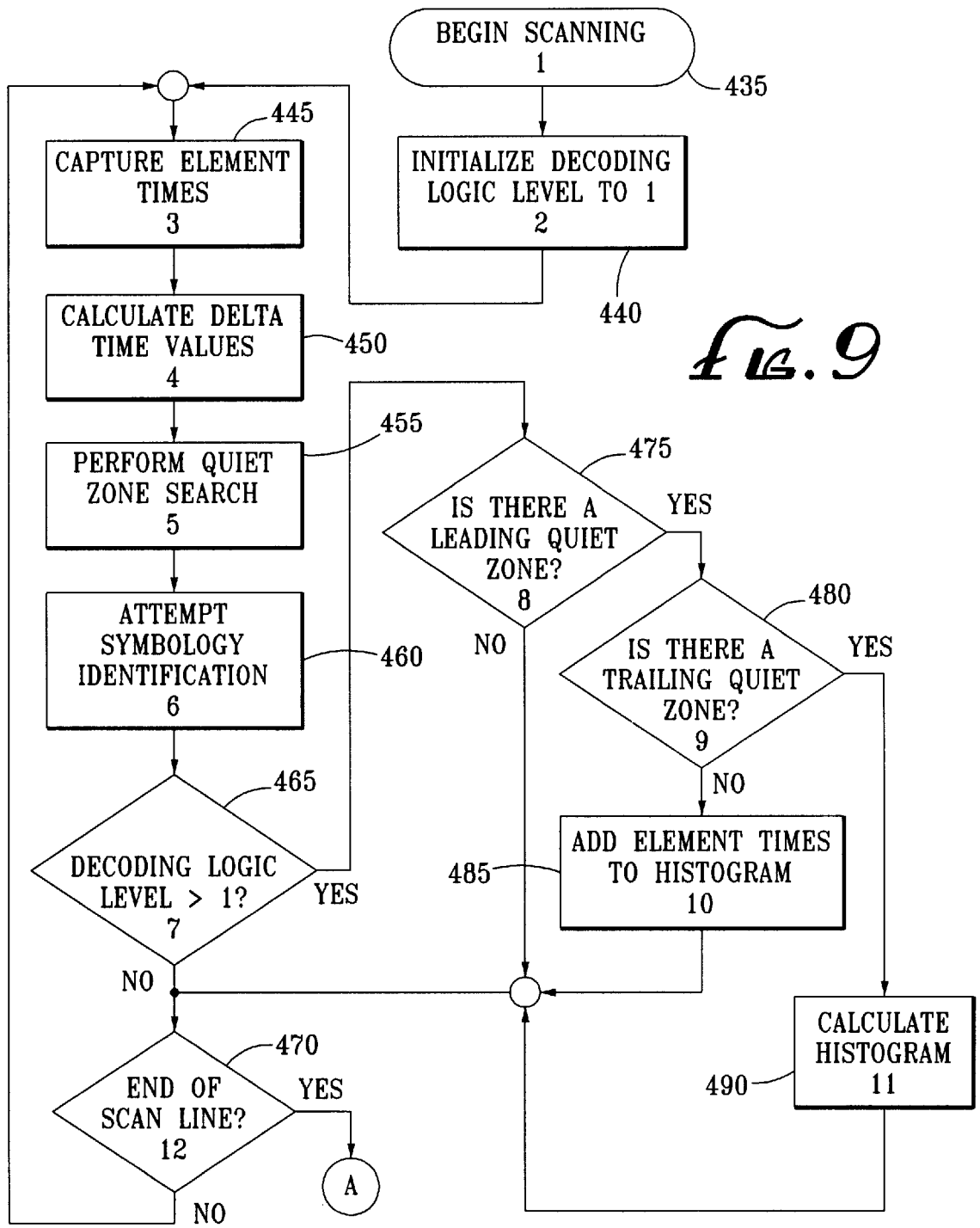
FIG. 9 is a flow chart diagram illustrating a portion of the functional blocks of an exemplary increased aggressiveness level decoding through time process implemented in accordance with the system and methodologies herein.

With reference first to FIG. 9, scanning begins at a first step 435 whereupon decoding logic is initialized to level 1 at a second step 440. Element times are captured in a third step 445, delta time values are calculated in a fourth step 450, a quiet zone search is performed in a fifth step 455 and symbology identification is attempted, as further described herein, in a sixth step 460. In a seventh step 465, the system then determines whether the decoding logic level is greater than 1. If not, then the system proceeds to the twelfth step 470 as further detailed hereinbelow. If the decoding logic level is determined to be greater than 1, the system proceeds to the eighth step 475 to determine whether or not there is a leading quiet zone that has been identified. If not, the system proceeds to the twelfth step 470 as further detailed hereinbelow. If a leading quiet zone has been identified in the eighth step 475, the system proceeds to the ninth step 480 to determine whether or not there is a trailing quiet zone that has been identified. If not, the system proceeds to the tenth step 485 and adds the identified element times to the histogram information and proceeds to the twelfth step 470 as further detailed hereinbelow. If a trailing quiet zone has been identified in the ninth step 480, the system proceeds to the eleventh step 490 to calculates the histogram information prior to proceeding to the twelfth step 470. In the twelfth step 470, the system determines whether the end of the scan line has been reached. If not, the system returns to the third step 445 for further capturing of elements and subsequent processing as set forth above. Upon determining that the end of the scan line has been reached in the twelfth step 470, the system then proceeds with decoding as further detailed and illustrated with reference to FIG. 10 below.

Figure 10:
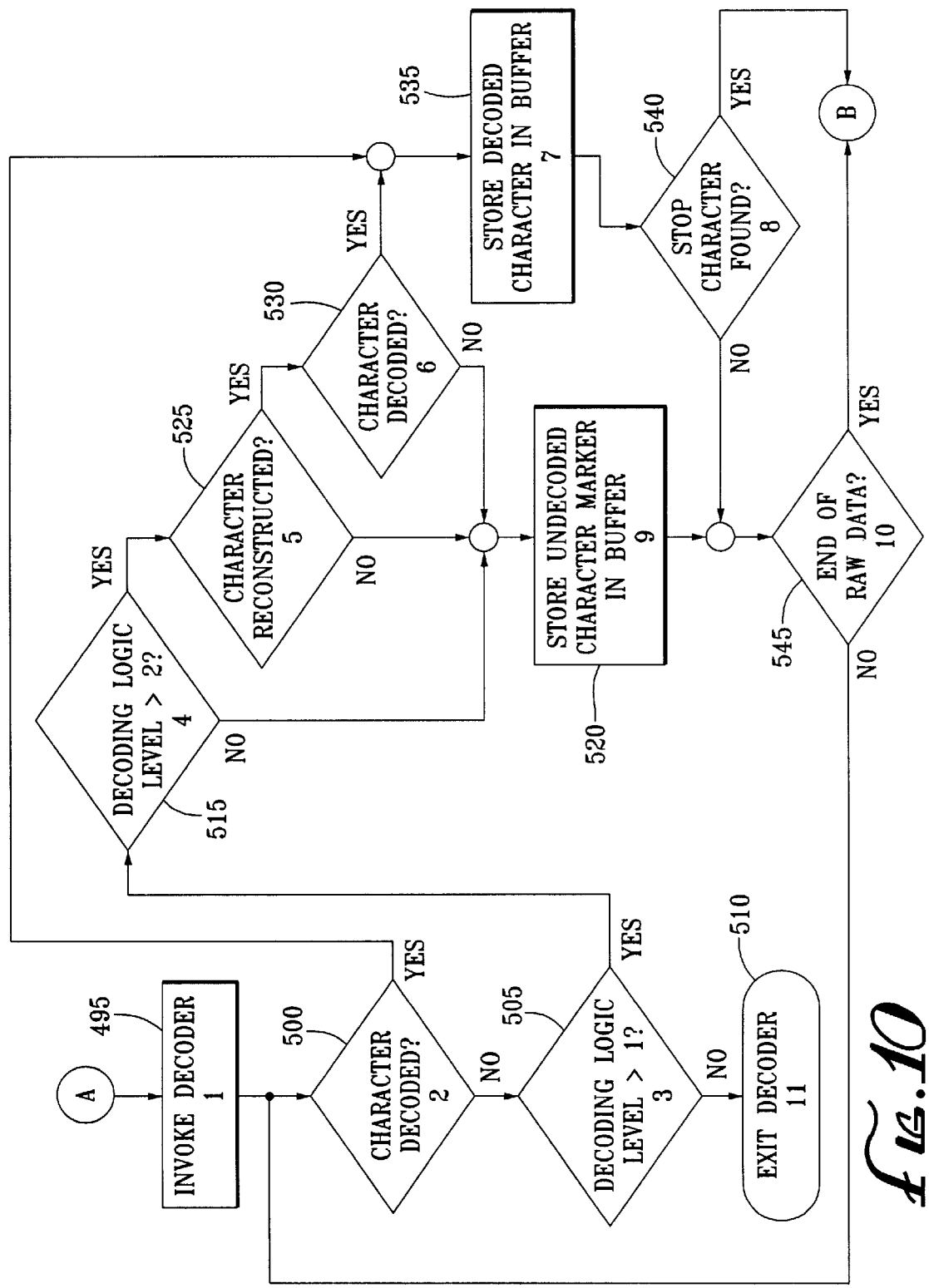
FIG. 10 is a flow chart diagram illustrating a second portion of the functional blocks of an exemplary increased aggressiveness level decoding through time process implemented in accordance with the system and methodologies herein.

In a first step 495 as seen in FIG. 10, decoding is invoked. In a second step 500, the system determines whether a character may be decoded. If not, the system proceeds to the third step 505 to determine whether or not the decoding logic level is greater than 1. If not, the system then proceeds to the eleventh step 510 wherein decoding is exited. If the decoding logic level is determined to be greater than 1 in the third step 505, then the system proceeds to the fourth step to determine whether or not the decoding logic level is greater than 2. If the decoding logic level is not determined to be greater than 2 in the fourth step 515, then the system proceeds to the ninth step 520 as further detailed hereinbelow. If the decoding logic level is determined to be greater than 2 in the fourth step 515, then the system proceeds to determine whether or not the character may be reconstructed in the fifth step 525. If not, then the system proceeds to the ninth step 520 as further detailed hereinbelow. If the character is reconstructed in the fifth step 525, the system then proceeds to the sixth step 530 to determine whether or not the character may be decoded. If not, the system then proceeds to the ninth step 520 as further detailed hereinbelow. If, as a result of the second step 500 or the sixth step 530, it is determined that a character may be decoded, the system then proceeds to the seventh step 535 to store the decoded character in a decoded character buffer. The system then proceeds to the eighth step 540 to determine whether or not a stop character has been found. If so, the system then proceeds with further processing in accordance with the routine detailed in conjunction with FIG. 11 below. If it is determined that a stop character is not found in the eighth step 540, the system then proceeds with the tenth step as further detailed hereinbelow. If, as a result of the fourth step 515, the fifth step 525, or the sixth step 530, the system determines that a character may not be properly decoded, an undecoded character identifier (i.e., marker) is stored in an appropriate buffer and the system proceeds to the tenth step 545. If an undecoded character identifier is stored in the ninth step 520, or a stop character is not found in the eighth step 540, the system proceeds to the tenth step 545 to determine whether the end of raw data has been reached. If not, the system returns to the second step 500 to determine whether or not additional characters may be decoded and proceeds again through the above steps accordingly. If it is determined that the end of raw data has been reached in the tenth step 545, then the system proceeds with further processing in accordance with the routine detailed in conjunction with FIG. 11 below.

Figure 11:
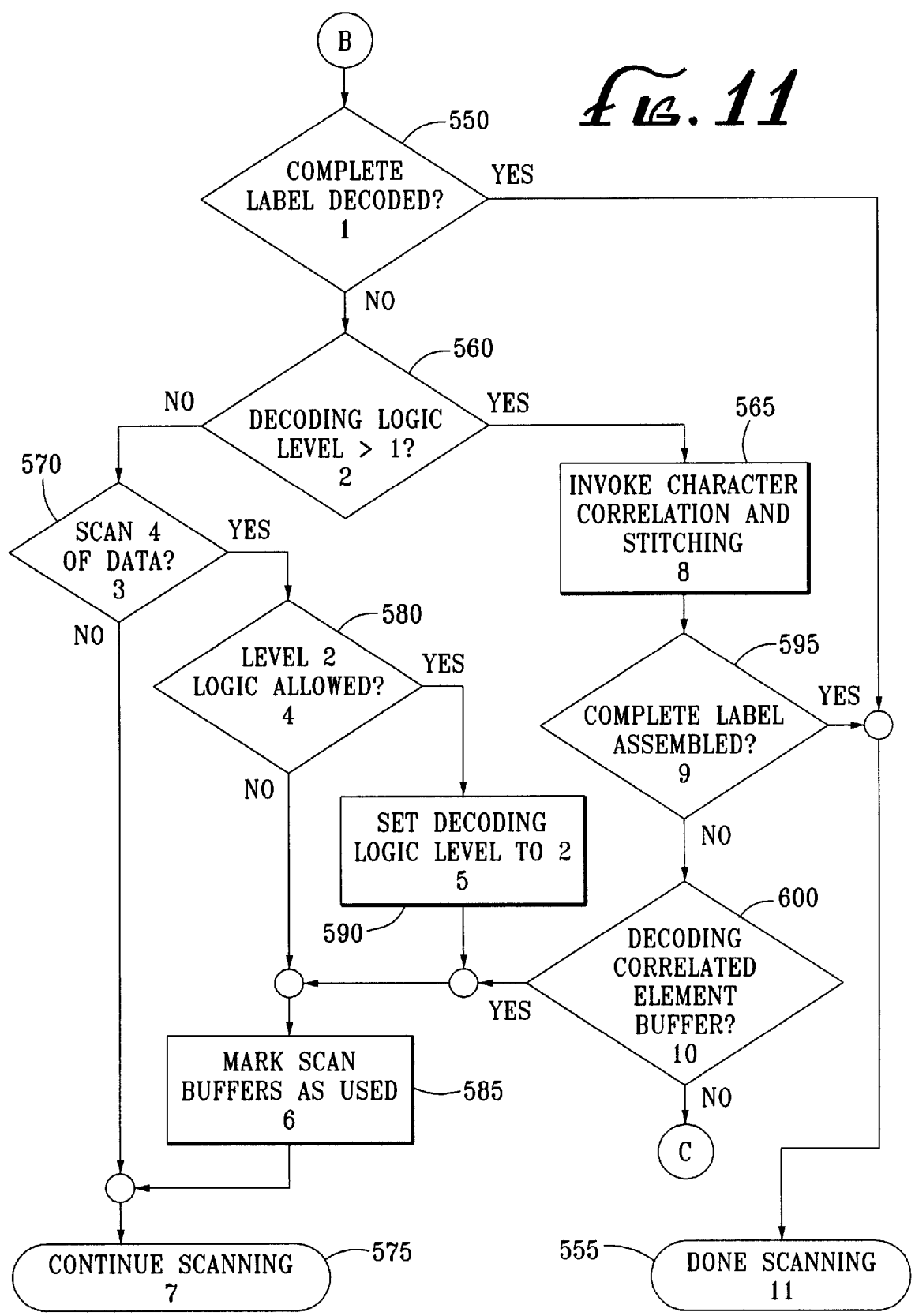
FIG. 11 is a flow chart diagram illustrating a third portion of the functional blocks of an exemplary increased aggressiveness level decoding through time process implemented in accordance with the system and methodologies herein.

With reference to FIG. 11, the system first determines whether or not a complete label has been decoded in a first step 550. If so, the scanning is done and the system proceeds to the eleventh step 555. If it is determined that a complete label has not been decoded, then the system proceeds to the second step 560 to determine whether or not the decoding logic level is greater than 1. If yes, the system then proceeds to the eighth step 565 as further detailed hereinbelow. If the decoding logic level is not greater than 1, the system proceeds to the third step 570 to determine whether the current scan is the fourth scan of the data. If not, the system proceeds to the seventh step 575 to continue scanning and processing as previously detailed. If it is determined that the current scan is the fourth scan of the data, the system then proceeds to the fourth step 580 to determine whether or not level 2 logic has been allowed. If not, the system proceeds to the sixth step 585 and marks the scan buffers as used prior to advancing to the seventh step 575 to continue scanning. If it is determined that level 2 logic has been allowed in the fourth step 580, the system then proceeds to the fifth step 590 wherein the decoding logic level is set to logic level 2 prior to advancing to the sixth step 585 to mark the scan buffers as used and then to the seventh step 575 to continue scanning. In the fifth step 565, character correlation and stitching are invoked based upon the determination in the second step 560 that the decoding logic level was greater than 1. The system then proceeds to the ninth step 595 to determine whether or not a complete label has been assembled. If so, scanning is done and the system proceeds to the eleventh step 555 to complete this processing. If it is determined that a complete label has not been assembled in the ninth step 595, the system then proceeds to the tenth step 600 to determine whether the correlated element buffer may be decoded. If so, the system proceeds to the sixth step 585 to mark the scan buffers as used prior to advancing to the seventh step 575 to continue scanning. If it is determined that the correlated element buffer may not be decoded in the tenth step 600, the system proceeds with further processing in accordance with the routine detailed in conjunction with FIG. 12 below.

Figure 12:
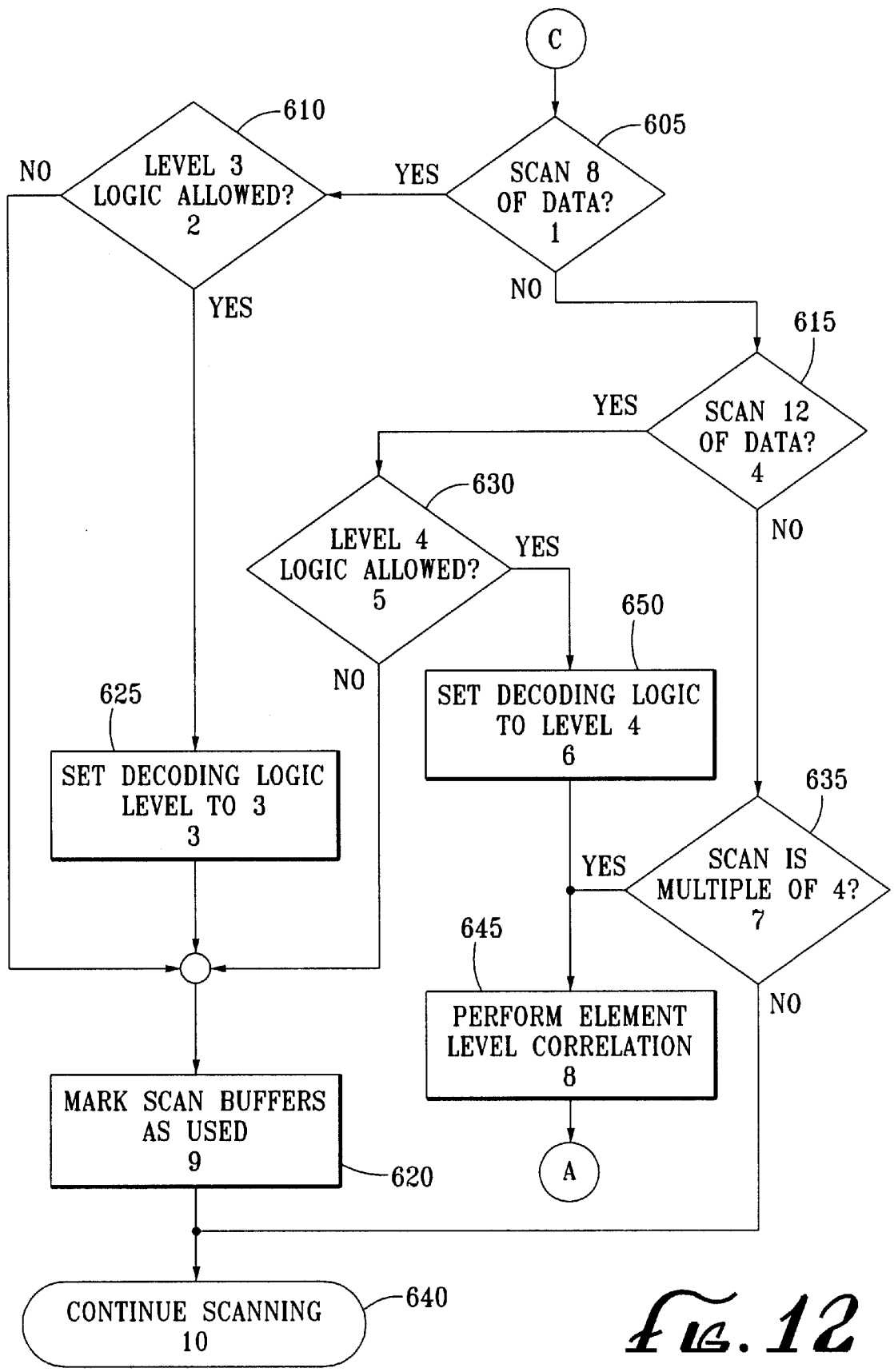
FIG. 12 is a flow chart diagram illustrating a fourth portion of the functional blocks of an exemplary increased aggressiveness level decoding through time process implemented in accordance with the system and methodologies herein.

With reference to FIG. 12, the system first determines whether or not the current scan is the eighth scan of data in the first step 605. If so, the system then proceeds to the second step 610 to determine whether or not level 3 logic is allowed. If the current scan is determined not to be the eighth scan of data in the first step 605, the system then proceeds to the fourth step 615 as further detailed hereinbelow. If it is determined that level 3 logic is not allowed in the second step 610, the system advances to the ninth step 620 as further detailed hereinbelow. If it is determined that level 3 logic is allowed in the second step 610, then the system proceeds to the third step 625 to set the decoding logic level to logic level 3 prior to advancing to the ninth step 620 as further detailed hereinbelow. If it is determined in the fourth step 615 that the current scan is the twelfth scan of data, the system then proceeds to the fifth step 630 to determine whether or not level 4 logic is allowed. If not, the system then proceeds to the ninth step 620 as further detailed hereinbelow. If the current scan is not determined to be the twelfth scan of data in the fourth step 615, the system then proceeds to the seventh step 635 to determine whether the current scan number is a multiple of four. If not, the system proceeds to the tenth step 640 to continue scanning. If it is determined that the current scan number is a multiple of four in the seventh step 635, the system then proceeds to the eighth step 645 as further detailed hereinbelow. If it is determined that level 4 logic is allowed in the fifth step 630, the system then proceeds to the sixth step 650 to set the decoding logic level to logic level 4 prior to advancing to the eighth step 645. In the eighth step 645, element level correlation is performed and the system is returned to the routine detailed in conjunction with FIG. 10 for further processing. In the ninth step 620, scan buffers are marked as used prior to the system advancing to the tenth step 640 to continue scanning.

Because security may decrease as aggressiveness levels increase (i.e., the more aggressive the technique, the more likely that decoding errors may arise in general), it is further envisioned in another aspect of the instant system and methodologies, that one or more of the more aggressive techniques may optionally be established for use only with respect to symbologies incorporating check digit capabilities, and with respect to which such check calculation is enabled—thus, allowing the check character calculation to give additional security to the decoding process under those circumstances.

Symbology Based Aggressiveness

Some existing scanners allow a user to set an overall decoding aggressiveness level; however, once set, this level is utilized with respect to all scans by the scanner. With respect to users, e.g., in industrial areas, who often need to decode several different symbology types, the overall setting for aggressiveness may pose an unwanted risk of misreads for some symbologies. In a further aspect of the system and methodologies herein, a desired decoding aggressiveness level may be set based on symbology type, for each symbology type to be scanned by a user. In this regard, the level of aggressiveness for a particular symbology may be established through user configuration or it may be determined by programming within the scanner itself (utilizing further techniques provided herein). In either event, the scanner could be made to maintain a decoding aggressiveness level for each bar code symbology. In this manner, a user could maintain the lowest risk of decode aggressiveness overall and still read labels in symbologies with poorly printed labels.

Learning Mode

The configuration of decoding for scanners can be very complex due to the many types of symbologies that may be encountered in different environments, as well as the many decoding techniques and attributes thereof that are common in scanners. In the past, a user (or scanner expert) would have to know about the configurable attributes of the scanner, as well as the user's environment, in order to configure the scanner appropriately. In yet a further aspect, the instant systems and methodologies provide for the determination of a decoding configuration through a learning mode. To this end, scanning data from labels in the user's environment may be used to set decoder configuration attributes. For example, in learning mode, the scanner may use all possible decoding techniques to determine the least aggressive technique required to decode the particular label scanned for learning. When learning mode is complete, the scanner would then use the learned aggressiveness to decode future labels. Accordingly, less intervention from a scanner expert is required. As well, the configuration of decoding attributes may easily be customized to the user's environment.

In conjunction with this technique, it is envisioned that the configuration of scanner attributes could be determined by putting the scanner into a learning mode. To this end, various techniques may be implemented either alternatively or in combination as a means of entering the learning mode. For example, the learning mode could be initiated and/or terminated through the use of special bar code labels which, when read, would result in entry of the learning mode. Further, a hardware button or switch may be utilized on the scanner body, or elsewhere, to provide access to the learning mode. Still further, a command from an external device which may be received through a defined interface may be utilized. Alternatively, the learning mode could be "on" all the time such that the scanner continues to learn and adjust to the scanning environment as it is performing actual scans.

Where the learning mode is separately activated (as opposed to continuously operating in the background at all times), the scanner would be freed to perform decodes upon exiting the learning mode. Based upon the configuration attributes established in the learning mode, the scanner would then focus only on the decoding techniques required for the labels of that particular environment; thus, resulting in more efficient decoding since otherwise non-productive decoding techniques may be skipped.

While in learning mode, the scanner would save configurable attributes that allow it to read labels that are presented. After saving the data, and exiting learning mode if necessary, the scanner would then continue to use the saved configuration to read future labels (until learning mode programming is received). The system and methodologies herein further envision that all of the attributes configured in a learning mode session with respect to a scanner could subsequently be downloaded from that scanner and uploaded to other scanners in the same environment.

In accordance with the system and methodologies herein, there are many attributes that could be learned. Exemplary of possible attributes that may, alone or in combination, be subject to configuration through a learning mode are:

Symbology types to be operated upon in a particular environment.

Threshold ranges, e.g., as previously discussed in relation to automatic programming of decoding thresholds to enable a user to easily adjust decoding aggressiveness to match label quality.

Maximum decoding aggressiveness level, e.g., as previously discussed in relation to the advancing of decoding aggressiveness through time.

Character correlation attributes, e.g., correlation across several scans as previously discussed.

Stitching attributes, e.g., stitching bar code fragments from poor quality labels as previously discussed.

Character reconstruction attributes for use in conjunction with decoding poor quality labels through reconstruction of normally undecodable characters as previously discussed.

Element correlation attributes as previously discussed.

Number of repetitive reads of a label required for successful decoding.

It is further envisioned that some or all of the attributes could be learned on a symbology basis as previously discussed herein with respect to decoding aggressiveness levels based on symbology types. For example, on a symbology basis, the scanner could keep track of the number of scan lines that it takes to reconstruct labels. It could also keep track of the level of reconstruction that was needed to reconstruct the labels of a symbology. Such information would then be used to help the scanner determine what kind of reconstruction/decoding to first attempt in future labels. It would also help the scanner determine how much data should be analyzed before moving to the next level of reconstruction.

Label Quality Reporting

Typically, bar code verifiers are used to acquire information about the quality of bar code labels. This process, however, requires additional work on the part of the user, i.e., that of scanning the bar code labels with the verifier. In a further aspect of the preferred system and methods herein, label quality feedback information is provided to the user about label quality based upon the techniques used to decode the labels. The algorithms currently employed for decoding poor quality labels each typically compensate for a particular type of label defect. For example, labels containing such defects as: invalid wide to narrow ratio, invalid element proportions, spots, voids, tears and disfigures can be reconstructed and decoded through the use of different algorithms. Therefore, by knowing which algorithms were used to decode a particular label, assumptions can be made about the types of defects that may have been included in that label. This label defect information, along with the decoded label data itself, could be made available to the user, allowing them to monitor the quality of the labels used in their system. By providing label quality feedback directly from the bar code scanner normally used in the process, the added expense and time of using the verifier could be greatly reduced.

The Computer Program Listing Appendix included herein on compact disc provides an exemplary software code portions for implementing routines in relation to correlation and stitching, element histograms and edge strength techniques and element width and quality measure techniques detailed herein in accordance with a preferred embodiment herein.

While the above-identified techniques are described in conjunction with one another for use in a scanner system, it is noted that the various aspects of the present system and methodologies may advantageously be selectively employed alone or in conjunction with one or more aspects in a particular system. Moreover, the various rules and methodologies set forth herein are not inclusive of all rules and methodologies that may readily be employed by one skilled in the art with respect to particular symbologies and/or user environments, nor are must all of the rules and methodologies detailed herein be employed with respect to a particular system. It will be apparent to those skilled in the art that certain rules may be obviated and other rules added as a result of system configuration requirements, symbology variations, user needs and specifications, environmental considerations, and the like. As well, while various aspects of the system and methodologies herein have been set forth by way of certain examples, many other variations and examples are possible and are intended to be within the scope and spirit of this disclosure and any claims made hereto. Furthermore, it is intended that modifications to the disclosed system and methodologies may be made without departing from the scope and spirit of the inventive concepts set forth herein and in the appended claims.

What is claimed is:

1. In a bar code scanning system, a method for compiling element width information from multiple scans of a barcode label for use in decoding character information comprising:

receiving a first scan of label information from a barcode label, the label information comprising bar element information and space element information;

capturing from the first scan of label information element widths in relation to the bar element information and element widths in relation to the space element information;

separately storing bar element widths captured from the first scan in a first histogram and storing space element widths captured. from the first scan in a second histogram;

receiving a second scan of label information from the barcode label, the second scan of label information comprising bar element information and space element information; and repeating the steps of capturing element widths and separately storing bar element widths in the first histogram and storing space element widths in the second histogram for the second scan of label information received, wherein the bar element widths captured from the second scan of label information are combined with the bar element widths previously stored in the first histogram and the space element widths captured from the second scan of label information are combined with the space element widths previously stored in the second histogram.

2. The method of claim 1 wherein the bar element widths in the first histogram and the space element widths in the second histogram are stored in association with corresponding ranges of element widths.

3. In a bar code scanning system, a method for compiling element width information from scans of label data for use in decoding character information comprising:

receiving at least one scan of label information comprising bar element information and space element information;

capturing element widths in relation to the bar element information and element widths in relation to the space element information;

separately storing bar element widths and space element widths in at least one data store, respectively, wherein the bar element widths and space element widths are stored in respective data stores associated with corresponding ranges of element widths;

repeating the steps of capturing element widths and separately storing bar element widths and space element widths for each scan of label information received; and calculating and storing the number of elements in a given range of element widths.

4. In a bar code scanning system, a method for compiling element width information from scans of label data for use in decoding character information comprising:

receiving at least one scan of label information comprising bar element information and space element information;

capturing element widths in relation to the bar element information and element widths in relation to the space element information;

separately storing bar element widths and space element widths in at least one data store, respectively, wherein the bar element widths and space element widths are stored in respective data stores associated with corresponding ranges of element widths;

repeating the steps of capturing element widths and separately storing bar element widths and space element widths for each scan of label information received; and calculating and storing the total sum of the widths in a given range of element widths.

5. In a bar code scanning system, a method for compiling element width information from scans of label data for use in decoding character information comprising:

receiving at least one scan of label information comprising bar element information and space element information;

capturing element widths in relation to the bar element information and element widths in relation to the space element information;

separately storing bar element widths and space element widths in at least one data store, respectively, wherein the bar element widths and space element widths are stored in respective data stores associated with corresponding ranges of element widths;

repeating the steps of capturing element widths and separately storing bar element widths and space element widths for each scan of label information received; and calculating and storing a value representing the average element widths for all scans of label information received.

6. In a bar code scanning system, a method for compiling element width information from scans of label data for use in decoding character information comprising:

receiving at least one scan of label information comprising bar element information and space element information;

capturing element widths in relation to the bar element information and element widths in relation to the space element information;

separately storing bar element widths and space element widths in at least one data store, respectively;

repeating the steps of capturing element widths and separately storing bar element widths and space element widths for each scan of label information received;

capturing edge confidence levels in relation to the bar element information and the space element information; and calculating average edge confidence levels in relation to all of the edge confidence levels captured.

7. The method of claim 6 wherein the strength of the first derivative of the signal comprising the scans of label information comprises the edge confidence levels.

8. The method of claim 6 wherein edge confidence levels information is utilized to confirm quiet zones.

9. The method of claim 6 wherein the calculated edge confidence level information is utilized to filter poor quality element width information from being stored in the at least one data store.

10. In a bar code scanning system, a method for distinguishing binary symbologies from multi-width symbologies through element width histograms generated from scans of label information comprising the steps of:

gathering element width data in relation to the bar and space elements identified from scans of label information;

storing the gathered element width data in association with element width ranges in a histogram, wherein the histogram comprises a series of element width ranges covering the possible element widths for a potential scanned label;

finding peaks in the histogram; and decoding peaks in the histogram to determine whether the gathered element width data represents a binary symbology or a multi-width symbology.

11. The method of claim 10 wherein the step of decoding peaks in the histogram further comprises the steps of:
calculating and storing the average element width for each peak found;
determining which peaks could represent element widths for the label; and,
decoding the determined peaks to identify the type of symbology.

12. The method of claim 11 wherein the step of decoding the determined peaks further comprises the step of matching element widths of the determined peaks with potential element widths for binary or multi-width symbologies, respectively.

13. The method of claim 10 further comprising the step of determining the quality of the gathered element widths as either binary or multi-width symbology element widths.

14. The method of claim 13 wherein the consistency of respective bar and space element widths gathered and the number of unused histogram peaks may be used to determine the quality of the gathered element widths as either binary or multi-width symbology element widths.

15. The method of claim 13 wherein the quality of gathered elements is determined by comparing the elements as detected with target element widths that have been calculated as being appropriate for the label if it were of a particular symbology.

16. The method of claim 13 wherein the quality of gathered elements is determined from a confidence rating for the edges of the elements as compared to a calculation of such value for the rest of the character or label being decoded.

17. In a bar code scanning system, a method for distinguishing binary symbologies from multi-width symbologies through element width histograms generated from scans of label information comprising the steps of:
gathering element width data in relation to the bar and space elements identified from scans of label information;
storing the gathered element width data in association with element width ranges in a histogram, wherein the histogram comprises a series of element width ranges covering the possible element widths for a potential scanned label;
finding peaks in the histogram; and
decoding peaks in the histogram to determine whether the gathered element width data represents a binary symbology or a multi-width symbology;
wherein the steps of gathering and storing element width data comprise the steps of:
identifying quiet zones of a potential label from the scans of label information;
identifying element width data for bar elements and space elements, respectively, in relation to the identified quiet zones;
adding identified bar element width data and space element width data, respectively, to the histogram in association with corresponding element width ranges;
generating the number of elements in each element width range; and
generating the total sum of all elements in each element width range, respectively.

18. In a bar code scanning system, a method for distinguishing binary symbologies from multi-width symbologies through element width histograms generated from scans of label information comprising the steps of:
gathering element width data in relation to the bar and space elements identified from scans of label information;
storing the gathered element width data in association with element width ranges in a histogram, wherein the histogram comprises a series of element width ranges covering the possible element widths for a potential scanned label;
finding peaks in the histogram; and
decoding peaks in the histogram to determine whether the gathered element width data represents a binary symbology or a multi-width symbology,
wherein the step of finding peaks in the histogram comprises the steps of:
generating sums of the number of elements in each consecutive set of two element width ranges for bar elements and space elements, respectively;
searching the consecutive sets of two element width ranges for which sums were generated to identify peaks;
calculating the average element width for each peak identified; and
selecting all sets of two element width ranges wherein the generated sums are greater than the sums of both neighboring sets of two element width ranges.

19. In a bar code scanning system, a method for recreating an otherwise undecodable character from a scan of label data comprising label character information, the method comprising the steps of:
receiving at least one scan of label character information comprising a plurality of characters, each character comprised of bar element width and space element width;
identifying an undecodable character containing a corrupted element width from the scan; and
reconstructing an originally intended element width associated with the undecodable character to correct for the corrupted element width and allow decoding of the undecodable character, wherein the step of reconstructing comprises the steps of
determining expected element widths for bar and space elements in the undecodable character;
comparing the bar and space element widths in the undecodable character against the expected element widths to identify the corrupted element width; and
adjusting the corrupted element width based on the comparison against the expected element widths, the number of elements, the placement of elements, and the size of element widths expected for the symbology.

20. The method of claim 19 wherein expected element widths are determined based upon knowledge of the total width of the character and specifics of the potential symbology represented by the scan of label data.

21. The method of claim 19 wherein the step of adjusting further comprises element filling.

22. The method of claim 19 wherein the step of adjusting further comprises element splitting.

23. The method of claim 19 wherein one of the steps of comparing and adjusting comprises edge-matching.

24. The method of claim 23 wherein the edge-matching utilizes edge strength information.

25. In a bar code scanning system, a method for recreating an otherwise undecodable character from a scan of label data comprising label character information, the method comprising the steps of:

receiving at least one scan of label character information comprising a plurality of characters, each character comprised of bar element width and space element width;

identifying an undecodable character containing a corrupted element width from the scan; and reconstructing an originally intended element width associated with the undecodable character to correct for the corrupted element width and allow decoding of the undecodable character, wherein the step of reconstructing comprises the steps of comparing the bar and space element width pattern of the undecodable character against all possible characters for the potential symbology represented by the scan of label data;

identifying the closest match based on the comparison; and selecting the closest match as the decoded character upon validation through subsequent scans of label data.

26. The method of claim 25 wherein the step of reconstructing comprises edge-matching.

27. In a bar code scanning system, a method for recreating an otherwise undecodable character from a scan of label data comprising label character information, the method comprising the steps of:

receiving at least one scan of label character information comprising a plurality of characters, each character comprised of bar element width and space element width;

identifying an undecodable character containing a corrupted element width from the scan; and reconstructing an originally intended element width associated with the undecodable character to correct for the corrupted element width and allow decoding of the undecodable character, wherein the steps of identifying an undecodable character containing a corrupted element width and reconstructing an originally intended element width comprise the steps of:

determining which elements in the character are corrupted by calculating and setting category thresholds based on widths;

sorting the elements into the categories by comparing each element in the character with the thresholds;

sorting the elements into the different categorized ranges of widths; and reconstructing the character elements based upon rules applied to the results of the element sorting.

28. The method of claim 27 wherein the step of reconstructing further comprises filling the corrupted element width.

29. In a bar code scanning system, a method for compiling element width information from multiple scans of a barcode label for use in decoding character information comprising:

receiving multiple scans of label information from a barcode label, the label information comprising bar element information and space element information;

capturing element widths in relation to the bar element information and element widths in relation to the space element information;

storing bar element widths captured from the multiple scans of label information in a first histogram and storing space element widths captured from the multiple scans of label information in a second histogram, wherein the bar element widths in the first histogram and the space element widths in the second histogram are stored in association with corresponding ranges of element widths; and calculating and storing the number of elements in a given range of element widths.

30. In a bar code scanning system, a method for compiling element width information from a single scan of label data for use in decoding character information comprising:

receiving a scan of label information comprising bar element information and space element information;

capturing element widths in relation to the bar element information and element widths in relation to the space element information;

storing bar element widths in association with ranges of bar element widths in a first histogram and storing space element widths in association with ranges of space element widths in a second histogram; and calculating and storing the number of elements in a given range of element widths.

31. The method of claim 30 further comprising the step of calculating and storing the total sum of the widths in a given range of element widths.

* * * * *

UNITED STATES PATENT AND TRADEMARK OFFICE
CERTIFICATE OF CORRECTION

PATENT NO.    : 6,513,714 B1                                                Page 1 of 1
DATED         : February 4, 2003
INVENTOR(S)   : Glen W. Davis and Jonathan R. Brandt It is certified that error appears in the above-identified patent and that said Letters Patent is hereby corrected as shown below:

Column 24,
Line 17, "is-compared" should read -- is compared --.

Column 41,
Line 10, "captured. from" should read -- captured from --.

Signed and Sealed this

Third Day of February, 2004

JON W. DUDAS
*Acting Director of the United States Patent and Trademark Office*